United States Patent [19]

Sanders, Jr.

[11] Patent Number: 4,856,920
[45] Date of Patent: Aug. 15, 1989

[54] DOT MATRIX PRINTING AND SCANNING

[76] Inventor: Royden C. Sanders, Jr., Burton Hwy., Wilton, N.H. 03086

[21] Appl. No.: 43,551

[22] Filed: Apr. 22, 1987

Related U.S. Application Data

[63] Continuation-in-part of Ser. No. 815,984, Jan. 3, 1986, Pat. No. 4,794,387, which is a continuation-in-part of Ser. No. 799,843, Nov. 18, 1985, abandoned.

[51] Int. Cl.$^4$ .................................................. B41J 3/12
[52] U.S. Cl. .................................... 400/124; 400/121; 101/93.05; 346/762; 346/108
[58] Field of Search ............... 400/118, 119, 121, 124, 400/126; 101/93.04, 93.05, 1; 346/76 L, 108, 155; 355/3 R; 340/728

[56] References Cited

U.S. PATENT DOCUMENTS

| | | | |
|---|---|---|---|
| 2,921,124 | 1/1960 | Graham | 340/728 X |
| 3,403,289 | 9/1968 | Garry | 307/228 |
| 3,418,518 | 12/1968 | Reese, Jr. | 315/385 |
| 3,437,874 | 4/1969 | Cressey et al. | 340/744 X |
| 3,479,453 | 11/1969 | Townsend | 340/733 X |
| 3,497,744 | 2/1970 | Himmelbauer et al. | 313/432 |
| 3,573,789 | 4/1971 | Sharp | 340/728 |
| 3,693,181 | 9/1972 | Marshall et al. | 346/55 |
| 3,737,914 | 6/1973 | Hertz | 346/75 |
| 3,752,288 | 8/1973 | Detig et al. | 400/119 |
| 3,786,478 | 1/1974 | King, Jr. | 340/728 |
| 3,852,772 | 12/1974 | Hecht et al. | 346/75 |
| 3,988,728 | 10/1976 | Inoue et al. | 340/724 X |
| 4,050,075 | 9/1977 | Hertz et al. | 346/75 |
| 4,059,183 | 11/1977 | Hoskins | 400/126 |
| 4,116,567 | 9/1978 | San Pietro | 101/93.05 X |
| 4,194,833 | 3/1980 | Lester et al. | 355/3 R |
| 4,212,009 | 7/1980 | Adleman et al. | 340/728 |
| 4,237,457 | 12/1980 | Houldsworth | 340/728 |
| 4,250,502 | 2/1981 | Klauch et al. | 340/728 |
| 4,297,022 | 10/1981 | Lester | 355/3 R |
| 4,314,282 | 2/1982 | Fishbeck et al. | 358/286 |
| 4,318,597 | 3/1982 | Kotani | 354/5 |
| 4,322,063 | 3/1982 | Fishbeck et al. | 267/160 |
| 4,339,208 | 7/1982 | Biedermann | 400/124 |
| 4,340,888 | 7/1982 | Seroskie | 340/755 |
| 4,349,828 | 9/1982 | Fishbeck | 346/75 X |
| 4,360,805 | 11/1982 | Andrews et al. | 340/744 |
| 4,365,549 | 12/1982 | Fotland | 346/153.1 X |
| 4,386,349 | 5/1983 | Granberg et al. | 340/723 |
| 4,400,791 | 8/1983 | Kitado | 364/900 |
| 4,402,620 | 9/1983 | Kekas | 400/320 X |
| 4,404,571 | 9/1983 | Kitamura | 346/108 |
| 4,408,907 | 10/1983 | Bernardis | 101/93.05 X |
| 4,415,889 | 11/1983 | Davis | 340/728 |
| 4,459,051 | 7/1984 | Kawai | 101/93.05 X |
| 4,481,509 | 11/1984 | Sasaki et al. | 340/728 |
| 4,513,444 | 4/1985 | Okai et al. | 382/56 |
| 4,521,774 | 6/1985 | Murphy | 340/745 |
| 4,533,268 | 8/1985 | Sanders | 400/322 |
| 4,684,937 | 8/1987 | Schine | 340/728 |
| 4,703,323 | 10/1987 | Troupes | 340/790 |

FOREIGN PATENT DOCUMENTS

| | | | |
|---|---|---|---|
| 62165 | 5/1981 | Japan | 400/124 |
| 2769 | 1/1982 | Japan | 400/124 |
| 47675 | 3/1982 | Japan | 400/124 |

Primary Examiner—Paul T. Sewell
Attorney, Agent, or Firm—Davis, Bujold & Streck

[57] ABSTRACT

A unique Dot Scanning System is described which gives superior quality speed performance. One form of this dot scanning system is intra-dot and is applicable to both serial and line impact dot matrix printers, line and serial thermal printers, ink jet, as well as laser and LCD printers. In general, the speed of quality printing is more than doubled for given printhead performance. Another aspect of the invention involves inter-dot scanning as well as intra-dot recording and can be used in all the above applications. The scanning is preferably perpendicular to the printhead motion over the paper.

8 Claims, 32 Drawing Sheets

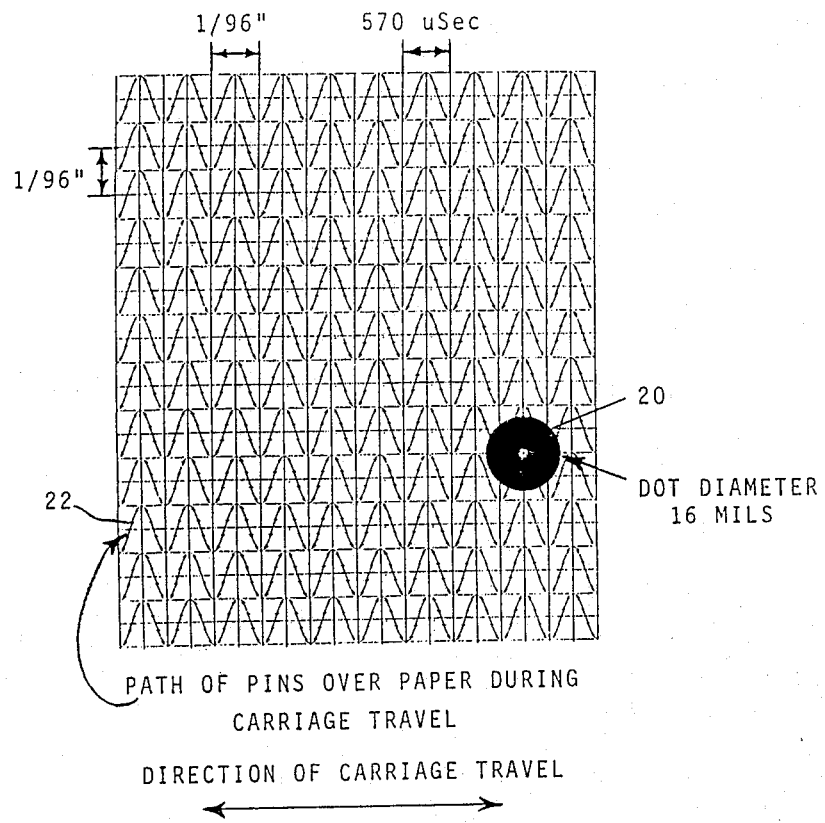
Fig. 2
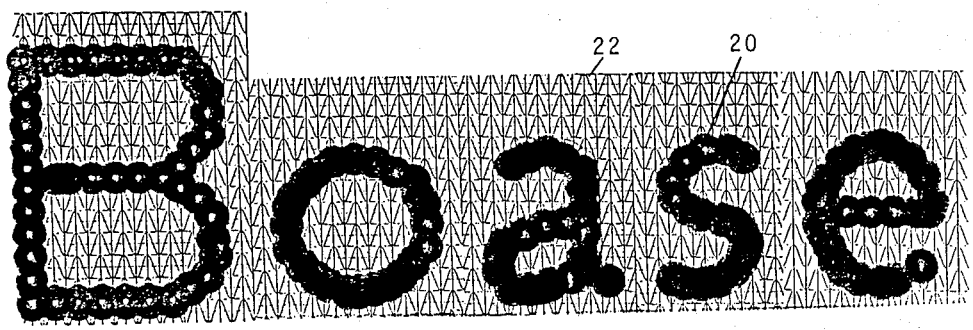
Fig. 3A
Boase
Fig. 3B

PATH OF PINS OVER PAPER WITH INTRA-DOT SCANNING

DIRECTION OF CARRIAGE TRAVEL
FIRST PASS - LETTER QUALITY

DIRECTION OF CARRIAGE TRAVEL   CARRIAGE SPEED 32 IPS
                               67 CPS WITH 4 PINS
SECOND PASS - LETTER QUALITY

DRAFT PRINTING - 320 CPS WITH 4 PINS / CARRIAGE SPEED 77 IPS

Baeos

Baeos

DOT DIAMETER 16 MILS
MATRIX INTERVAL 25 uSec
VERTICAL SCAN FREQ 2000 HZ
CARRIAGE SPEED 41.6 IPS

DIRECTION OF CARRIAGE TRAVEL
PATH OF PINS DURING CARRIAGE TRAVEL
NEAR LETTER QUALITY

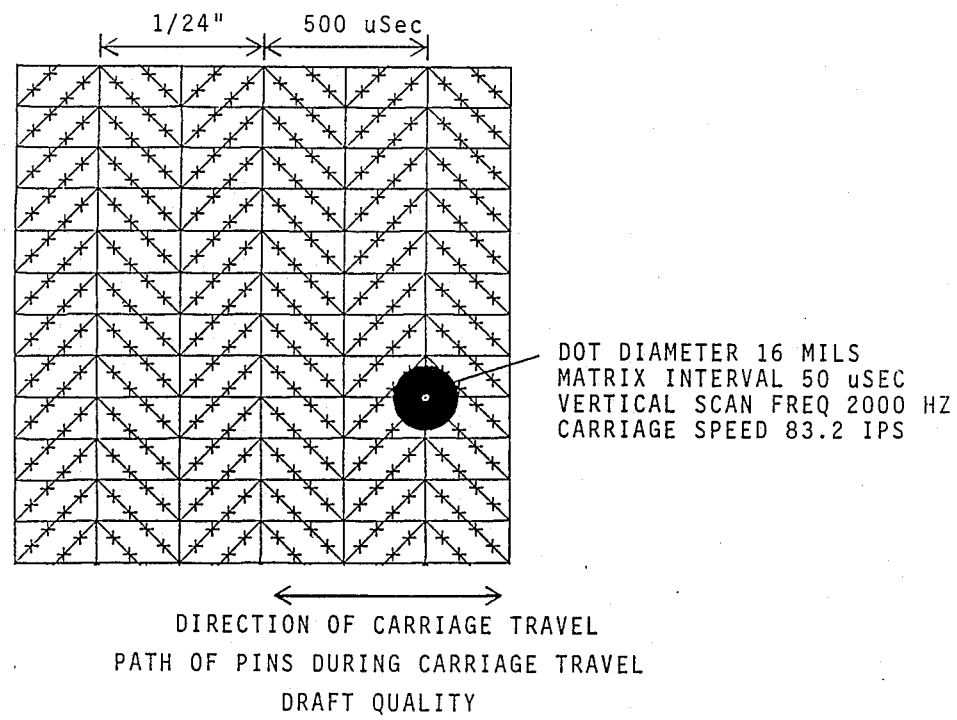
Fig. 11
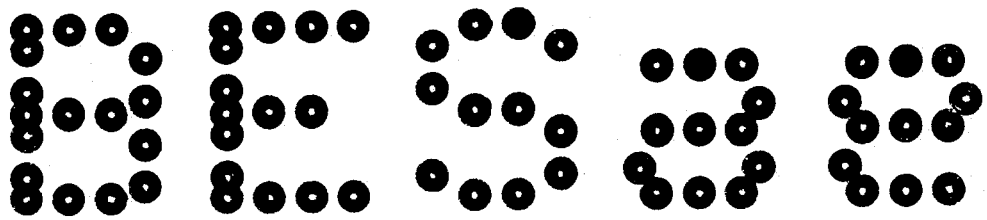
Fig. 12A
BESae
Fig. 12B

FIRST METHOD OF INTRA-DOT SYNCRONIZATION

RELATIONSHIP OF FIRING OF PINS AND IMPACT ON PAPER

UNDERLINED NUMBERS INDICATE FIRING TIME TO IMPACT AT NON-UNDERLINED NUMBERS

SECOND METHOD OF INTRA-DOT SYNCRONIZATION

PATH OF PRINTING ELEMENTS OVER PAPER DURING PAPER TRAVEL

LINE THERMAL OR ELECTROSTATIC PRINTER
INK JET OR ION DEPOSITION

VERTICAL SCANNING MECHANISM FOR LINE IMPACT PRINTER

Baeos

DOT MATRIX SHUTTLE PRINTER EFFICIENCY

HORIZONTAL POSITION OF PRINTHEAD

TURN AROUND & LINE FEED    TURN AROUND & LINE FEED

PRINT TIME
PIN SPACING

TIME

HORIZONTAL VELOCITY OF PRINTHEAD

HORIZONTAL VELOCITY

TIME

Fig. 23
(Prior Art)

4 LINE 20 PIN MULTI-LINE PRINTHEAD

PRINTHEAD MAKES TWO PASSES FOR PRINTING

4 LINES OF DRAFT QUALITY PRINTING (1500 cps) 15 ppm

PRINTHEAD MAKES FOUR PASSES FOR PRINTING

4 LINES OF LETTER QUALITY PRINTING (400 cps) 4.3 ppm

PATH OF LASER BEAM OVER DRUM DURING HORIZONTAL SCAN

FRACTIONAL SCAN SHOWN - SCAN EXTENDS OVER FULL WIDTH

LASER SCANNING PATTERN WITH 10 MIL DOT
AMPLITUDE OF SCAN ± 4.2 MILS

LASER SCANNING PATTERN

PATH OF THE BEAMS OVER DRUM IN LCD OR LED WITH PSEUDO
SAWTOOTH MODULATION USING A MOVING FRESNEL BELT LENS

INTRA-DOT SCANNING DIRECTION

PATH OF ION BEAMS OVER DRUM - PARTIAL WIDTH
SHOWN ONLY - 150 BEAMS USED PER INCH OF WIDTH

PATH OF ION BEAMS OVER DRUM WITH PSEUDO SAWTOOTH.
PARTIAL WIDTH SHOWN ONLY 75 BEAMS PER INCH USED.

IDEAL SCANNING PATTERN

INTRA-DOT SCANNING WITH DOUBLE SCAN

OR

INTRA-DOT SCANNING OF GREY SCALE GRAPHICS

COMPUTER MONITOR WITH SYNCRONIZED INTRADOT SCANNING

This is an actual print sample
of the new printer technology
of the present invention
entitled DOT MATRIX PRINTING
and SCANNING.

DOT MATRIX PRINTING AND SCANNING

BACKGROUND

This application is a continuation in part of Ser. No. 06/815,984, filed 01/03/86, now U.S. Pat. No. 4,794,387, which is a continuation in part of Ser. No. 06/799,843, filed 11/18/85, abandoned.

There are two dot matrix principles used in dot matrix printers today. One uses a matrix size which is approximately equal to the dot size. The second uses a dot size that is up to ten times larger than the matrix size. By matrix size is meant the distance between the centers of the possible dot positions or the number of possible dot positions per inch (both horizontally and vertically) which can be printed.

Most, if not all, thermal and laser printers use a dot size equal to the matrix size, while ink jet printers have been designed both ways.

All quality printing by impact dot matrix printers use a dot size considerably larger than the matrix size, while in the draft mode, the dot size and the matrix size are approximately the same.

Quality printing is performed by using a seven to nine pin printhead and using multiple passes of the printhead moving the printhead or paper a fraction of a dot between passes (Reference R. C. Sanders U.S. Pat. No. 4,159,882). Another method currently used employs 18 to 24 pins arranged in two or three staggered rows. At the same time, the matrix used for firing pins during the horizontal sweep of the carriage is a fraction of a dot width.

The U.S. Pat. to Kawai No. 4,459,051 describes a somewhat similar system in which the jewel which supports the print pins is vertically moved instead of moving the paper vertically between each pass. There are a number of other variations of jewel shifting for the same purpose described in the prior art.

However, all of the various systems trade quality for speed, the limiting factor being the refire time of any print pin. In order to get horizontal dot overlap, one must slow down carriage speed 2:1. So-called two pass printing, or ½ vertical dot overlap, takes twice as much time for a speed reduction of 4:1 over draft printing. So-called four pass printing, or ¾ vertical dot overlap, takes four times as much time for a speed reduction of 8:1 over draft printing.

Eighteen pin printers were developed to speed up printing. By having nine of its pins in ½ dot position, one gets a 2:1 speedup over a nine pin printer. ½ dot overlap vertically is attained with one pass. However, such a printer must make two passes to get ¾ dot overlap vertically to achieve the best letter quality. Unless nine of the pins are shifted with respect to the other nine pins, there is no gain in draft speed.

Twenty-four pin printing was developed by the Japanese primarily to print Kanji characters. They generally use pins 8 mils in diameter to make a 10 mil dot. The pins are usually spaced about 4 mils apart vertically. This type of printer obtains a dot that overlaps 60% in one pass. But its speed is limited because it must usually use two dots to make the 14–16 mil vertical line that most non-Asians seem to prefer. Again, the twenty-four pin can get about 2.5 times the letter quality speed in draft compared to 8:1 for the nine pin.

Impact line printers using an oscillating shuttle are described by Barrus et al in U.S. Pat. Nos. 3,941,051 and 4,233,894. This type of oscillating shuttle is used commercially and most of these printers have used thirty-four pins separated horizontally 0.4 inches which are moved sinusoidally about 0.5 inches. Each pin prints for 0.4 inches horizontally and the paper is moved vertically on the top and the bottom of the sine waves. Depending on the average horizontal speed and amount of paper motion, these printers print draft characters, near letter quality characters with a 50% vertical dot overlap to ¼ the speed of the draft, or letter quality characters with 75% vertical dot overlap at ⅛ the speed of draft.

For a given speed printing element, a 34 pin horizontal shuttle is approximately 34/9 or 3.8 times as fast as a 9 pin serial printer in each of the different quality modes, because one can complete a raster scan of the page by different means, but the resulting speed is proportional to the number of pins used at a given speed.

To say this in a different way, a given quality letter needs a given fineness of raster scanning, whether it is scanned with 9 pins vertically spaced moving across the page or 9 pins spaced horizontally across the page, it takes the same length of time. If the number of pins is increased, for example, from 34 to 68, speed is increased in proportion to the number of pins. However, if one spaces the same number of pins vertically, one gets the same result.

Another type of scanning system is described by Hayashi in Japanese Kokai No. 62165, where a vertical oscillation is superimposed on the horizontal scan of the page. The total amplitude of the vertical oscillations, however, is no more than ½ the pin spacing. This effectively limits the dot interpolation to the top and bottom of a sine wave as the equivalent of two pass printing. While it can increase the quality of the resultant printing, it has no speed advantage over the other systems, such as the two pass printing described by Sanders, Kawai and others. Using the pattern that he shows he would get characters 72H×144V/inch by (conventional matrix definition). which would be useful for draft characters but not as much as 144H×72V which does not need this modulation. It is true that with Hayashi you can get twice as many positions for vertical or horizontal lines but with the pattern shown you would not overlap dots to get a smooth line to the eye. Perhaps the 72H×144V is useful in Kanji characteris. If you try to get a useful matrix for near letter quality letters it would be a minimum of 240H×144V but preferably 480H×144V. This is possible but requires the movement of the jewel to be 8 to 16 Khz (assuming an intra-dot period of 0.15 to 0.03 of the period shown) which is very difficult and may be impractical to do with today's technology. However, if you succeed, you get two pass printing without the speed advantage of intra-dot scanning. He could fire at intermediate points but he would get very uneven vertical resolution which is really not useful. Japanese Kokai Nos. 002769 and 047675 to Kariyama show similar oscillations of the jewel at less than the amplitude of the dot spacing. As in Hayashi, there is no increase in speed; only an increase in quality. It is like two pass printing.

Fishbeck U.S. Pat. No. 4,349,828 considers two cases in both of which oscillations in the second direction are twice the frequency of the oscillations in the first direction. In intra-dot scanning in accordance with the present invention when applied to line shuttle printers, the shuttle motion might be from 0.2" to 0.5". The period of the intra-dot oscillations might vary from 1/24" to 1/120" which means we are dealing in cases where the number of oscillations in the second direction are 5 to 60 times the number of oscillations in the first direction. The number of firing points would be from 20 to 500 points per half shuttle oscillation.

FIGS. 3 and 6 of U.S. Pat. No. 4,349,828 illustrate a very special limited case of intra-dot scanning. It illustrates about seven possible firing points during horizontal scan. It would be difficult to increase this very much in comparison to the 20 to 500 points obtained with intra-dot scanning of the present invention. This Case 2 is limited to very dense elements concerned with draft type printing. Within these limitations, Case 2 could increase the speed in the same manner as intra-dot scanning by using alternate scans. It is not obvious that Fishbeck is aware of this advantage. However, if it is used in this matter, the number of firing points is reduced to three or four, further reducing the utility of this method.

The method of scanning used by intra-dot scanning of the present invention is much different than that used by Fishbeck and gives a lot more flexibility in using intra-dot scanning in almost any situation.

BRIEF SUMMARY OF THE INVENTION

This invention is based on using a dot size a least as large as the matrix size regardless of the type of printer. To achieve scanning by the dot matrix printing system of the present invention the printing means is moved relative to the recording means with a scanning motion having a major direction and means are provided for imposing on said scanning motion a cyclical variation in the scanning motion transverse to its major direction.

This cyclic variation preferably has a peak to peak amplitude at least equal to the spacing between two adjacent dot creating means (e.g., print pins). The important point is that the cyclical variation is sufficient to permit dots along a horizontal line, (e.g., the scanning direction) to be produced by more than one dot creating means so that a second dot creating means can be activated within the refire time of the first dot creating means. Thus the refire time of a pin (for example) is no longer the limiting factor in scan speed. In the case of a shuttle printer the same dot creating means operates on a different pass of the shuttle, also removing the refire time limitation. Thus, a printing head (either matrix or shuttle) having the type of cyclic motion described herein can have a speed twice that obtained by multi pass printing and the like.

If the amplitude of the cyclic variation is increased even more (as shown in FIGS. 7, 9 and 11), we can actually use more than two pins to make a horizontal line and the speed gain can theoretically be greater. In impact dot matrix printers, however, the dwell time limits the speed increase. As we increase the amplitude of the cyclic variation, we increase the tip speed of the pin. As a result, above certain tip speeds, the dot on the paper becomes an egg shape instead of round, somewhat intermittently. This causes a very undesirable deterioration in quality. The shorter the dwell time, the faster the tip velocity and consequently, the greater the speed gain. With the best printhead technology today, the dwell time limits us to a 2 to 1 speed increase.

In the case of ink jet, electrostatic, laser, LCD or LED printing, we do not have the equivalent of dwell time, so that this effect would not be the limiting factor.

In the case of thermal or thermal transfer printing, the required dwell time is a function of the smoothness of the paper and this dwell time is the speed determinant.

In one preferred form of the invention (intra dot scanning) the cyclical variation completes at least one cycle during a scan equal to the dot size. The cyclical scan has a duration equal to or longer than the dot refire time and an integral number of dots can be created at predetermined points along the cyclical path.

It is important also that the driving frequency for the cyclical variation be derived by sub-dividing the matrix pulses where a dot can be placed and be phase-locked in position. It is also important that the driving frequency and the beginning of each scan be phase locked together. Otherwise the electronics for trying to predict correct firing time can be enormously complex, if not impossible.

Intra-Dot Scanning Period

As mentioned above, the Intra-Dot Scanning Period must be a sub-multiple of the pitch of the characters (characters per inch) with mono-spaced characters and must be small enough for getting the variable widths of proportional characters. Since the average printer customer wants 10, 12 and 15 pitch, the period of 1/20" can be used for letter quality (1/60" for a 2 pass equivalent as shown in FIG. 3D).

An interesting alternative is to use 1/90" for 10 and 15 pitch and 1/96" for 12 pitch. This means we must change the intra-dot frequency by 6-⅔% in going from 10 or 15 pitch to 12 pitch and we must straddle these frequencies equally above and below the intra-dot mount resonance.

The advantage of this latter method is as follows: There is a maximum instantaneous velocity that the end of the print wire can have without making elipses instead of round dots. If this velocity is exceeded, the quality of the letters deteriorates rapidly. The speed printhead technology used in the present invention is about 75"/second. The vertical velocity is $2\pi f$ A SIN $2\pi f$ which must be combined with the horizontal velocity. If A=0.005" and f=2000 Hz, the horizontal carriage speed is 33⅓"/sec for 1/60" period which gives a wire tip speed of 71"/sec which is safely under 75"/sec. If one uses a period of 1/45" (two pass 1/90") and 1900 Hz intra-dot period, the carriage speed is 42.2"/sec. and the wire tip speed is 73"/sec. Since the speed of the printer is directly proportional to carriage frequency, one gets 26% more speed at all qualities for the complication of a dual intra-dot frequency.

In order to minimize confusion, the application of this principle to each type of preferred printer is described separately in the following detailed description wherein:

FIG. 2 is an enlarged schematic diagram of the path of the print pins across the paper;

FIG. 3A is a view similar to FIG. 2 showing the creation of a word;

FIG. 3B is the word of FIG. 3A reduced to normal size;

FIG. 11 is similar to FIGS. 7 and 9 but with the horizontal scale expanded 4 to 1 to give draft quality;

FIGS. 12A and 12B show the print of a word with the scan of FIG. 11;

FIG. 23 shows the relationship of useful print line to total time for prior art shuttle printer.

FIGS. 26, 27, 29 and 30 illustrate several different types of scan showing the application of the invention to a laser printing system and the like.

SERIAL IMPACT DOT MATRIX PRINTER USING SYNCHRONIZED INTRA-DOT SCANNING

Figure 1B:
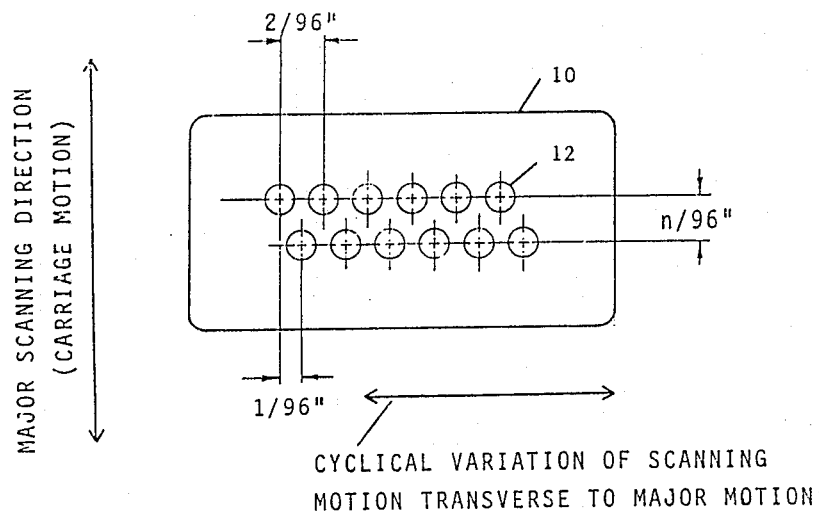
FIG. 1B is a diagrammatic schematic side view of the dot matrix printhead of FIG. 1A showing the means for oscillating the head transverse to the major scanning motion.
Figure 1A:
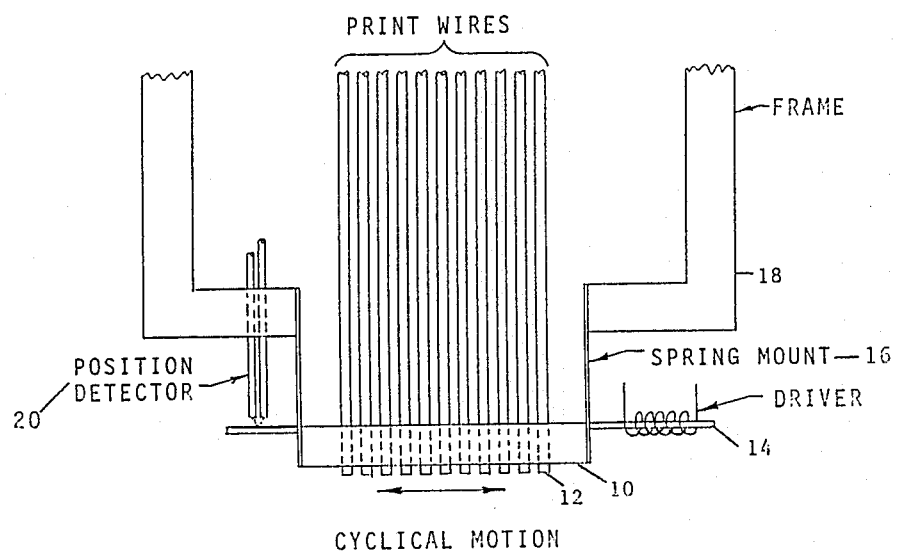
FIG. 1A is a diagrammatic schematic end view of one type of dot matrix print head that can be used in the present invention.

A 12-pin printhead 10 is used in this first example arranged in two rows of six pins 12 as shown in FIG. 1A. This printhead may be made in accordance with the teachings of my earlier U.S. Pat. No. 4,552,064 or my copending application Ser. No. 911,954 filed Sept. 25, 1986. The vertical spacing of the pin centers is 1/48" in each row and, due to the staggering, the effective spacing between the pin centers is approximately 1/96". The pin diameter is 1/72" and the dot diameter made on the paper is 16 mils. If the pin diameter is reduced or increased, it is important to scale the above dimensions as well as increase or decrease the number of pins in the printhead.

The ends of the pins are moved in sinusoidal fashion plus or minus 5 mils (1/96") as the carriage is moved horizontally across the paper. This motion is created by driver 14 (FIG. 1B) operating on the printhead 10. Since the printhead 10 is supported on a frame 18 by spring means 16 the printhead will oscillate at a frequency controlled by the drive and the spring mount. One cycle is made every time the carriage is moved 1/96" horizontally. The permissible firing points (matrix) are approximately 10 parts equally divided in time for every complete vertical sine wave cycle. This gives a matrix size of 960/horizontally and about 300/inch vertically. (It is obvious that the intra-dot scanning cycle could be divided into a lesser or greater number of permissible firing points, say 2 to 20 or more points.) It is important that there be an integral number of firing points per intra-dot scanning cycle.

The motion of the end of the pins for a 12 pin printhead is shown in FIG. 2. The carriage speed is adjusted so that the refire time is equal to ¾ of an intra-dot scan cycle for quality printing. If the refire time is 400 useconds, the carriage speed would be 18.75 inches/second.

FIG. 3A illustrates a word printed with various letters designed with the FIG. 2 matrix, enlarged about 20 times. FIG. 3B shows the same letters reduced to actual size. One can see by the layout of dots and the actual size letters that the quality is at least as good as 4 pass 9 pin output. Using a 2500 Hz printhead, the speed of the intra-dot scan printer (12 pins) would be 187.5 cps (draft speed 500 cps) for 10 pitch letters as compared with 60 cps (draft speed 500 cps) for the 4 pass 9 pin printer. The speed advantage is obvious. If these same letters were made with a 2500 Hz 18 pin printhead with two passes, the speed would be 120 cps (draft speed 500 cps). A 1875 Hz 24 pin printhead would give the same speed and almost the same quality.

The advantage of the intra-dot scanning system is that it gives the same performance as a 24 pin printhead with, of course, far less parts and cost. It gives superior performance to both the 9 pin and 18 pin printhead used in a multipass printing system.

As can be seen by comparing FIGS. 3A and 2, the horizontal line forming the top of the B can be printed by adjacent dot creating means. Thus, the first dot can be one dot creating means, a second dot along the horizontal line can be created when the adjacent dot means has been moved up onto the horizontal line. This could take place within the refire time of the first pin so that the speed of the scan can be effectively doubled, thus doubling the speed of printing. However, it is important that the second pin have a sufficient cyclical variation so that it is moved into exact horizontal projection with the first dot created by the first pin.

Figure 3C:
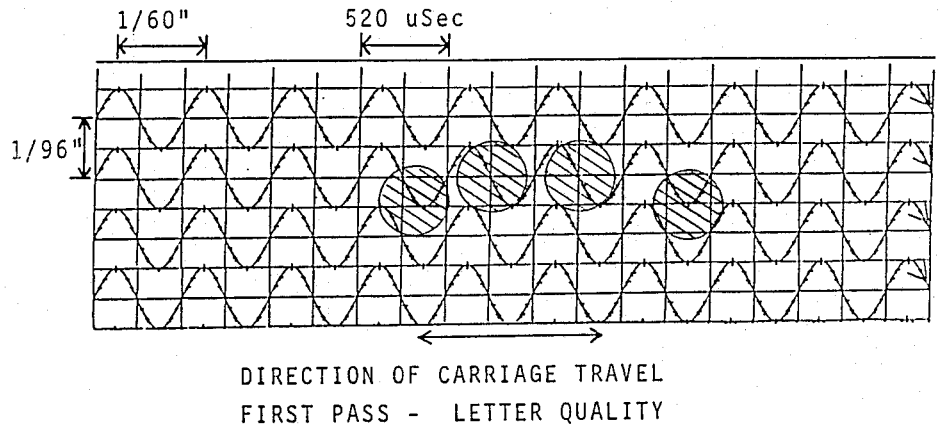
FIGS. 3C through 3E are similar to FIG. 2 showing alternate dots.
Figure 3D:
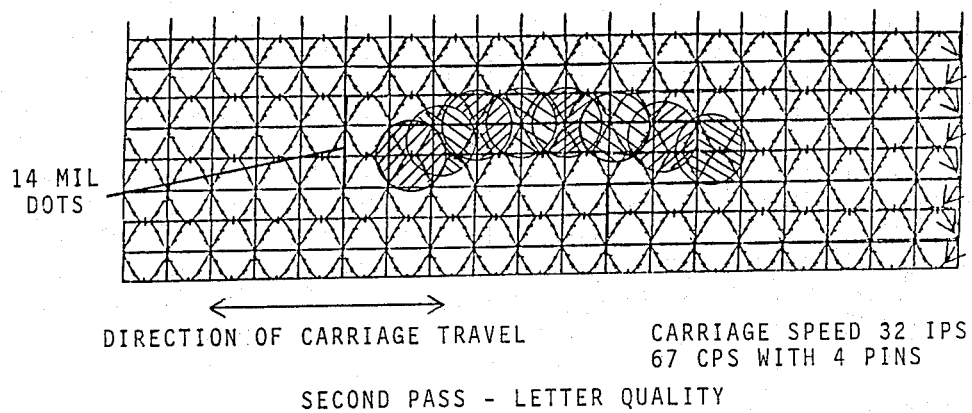

In FIGS. 3C through 3D there are shown expanded drawings of alternative dots formed during the refire time of first dot means (3E) or on second pass by single dot means (3C and 3D). In each case the dots are cross hatched differently to show which pin or which pass is creating the dot.

FIGS. 3C and 3D show a preferred method used for letter quality using two passes without paper motion. The carriage speed is almost twice as fast as that shown in FIG. 2 so the printing speed is almost as good and it has the advantages of allowing more dot overlap on the vertical strokes and it is easier to make diagonals and curves.

Figure 3E:
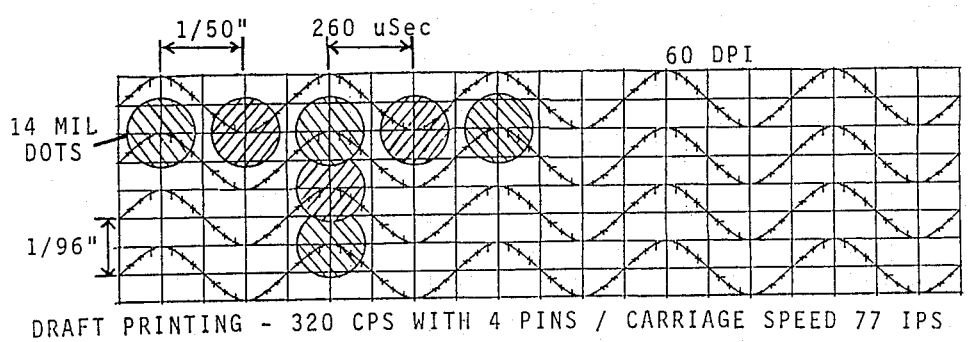

Near letter quality letters can be formed by one pass of the carriage as shown in FIG. 3C and draft quality can be formed by speeding up the carriage to 77 cps as shown in FIG. 3E.

The intra-dot scanning system need not be sinusoidal, although that or a triangular scan is near optimum.

Figure 4:
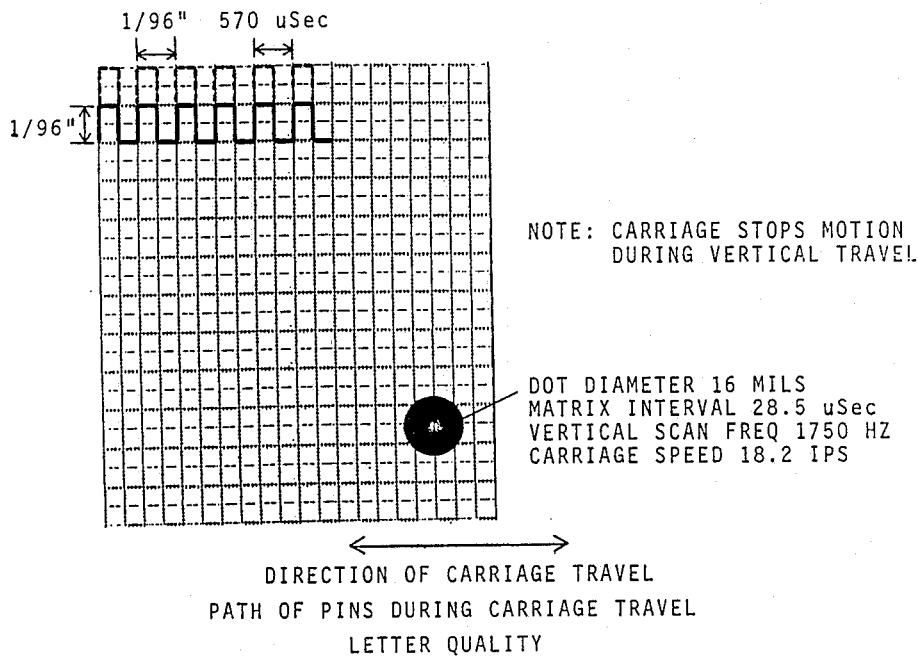
FIG. 4 is similar to FIG. 2 but shows a partial portion of two adjacent square waves on a grid, one shown in dashed lines the other in a solid line.
Figure 5:
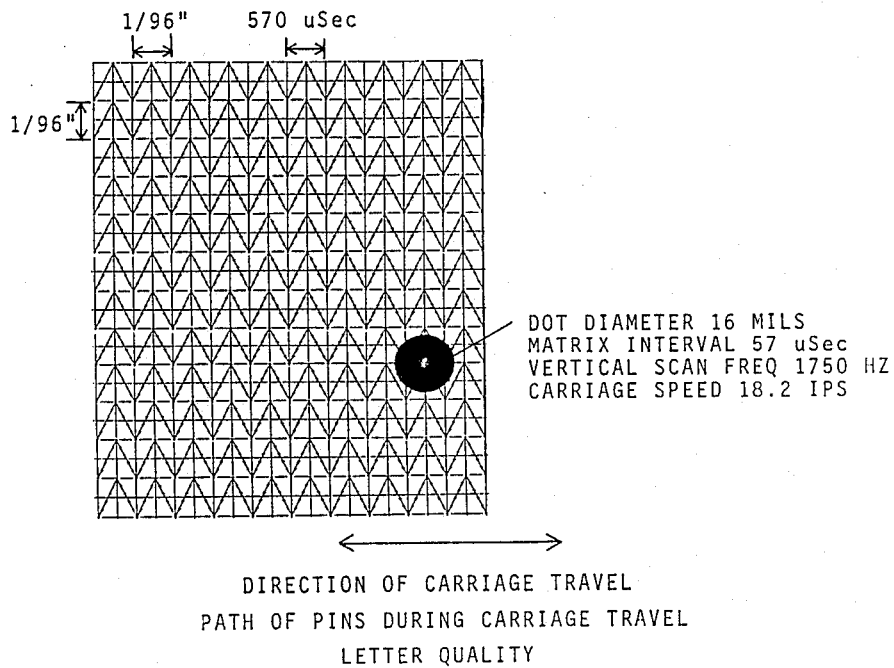
FIG. 5 is similar to FIG. 2 but shows a triangular wave.

FIG. 4 shows a square wave scan system and FIG. 5 shows a triangular wave system. To obtain a square wave one preferred method comprises having the paper stationary during the horizontal scan and a stationary print head during the vertical scan. Obviously, scan waves could be used that lie between the triangular wave and the sine wave and between the sine wave and the square wave.

Figure 38:
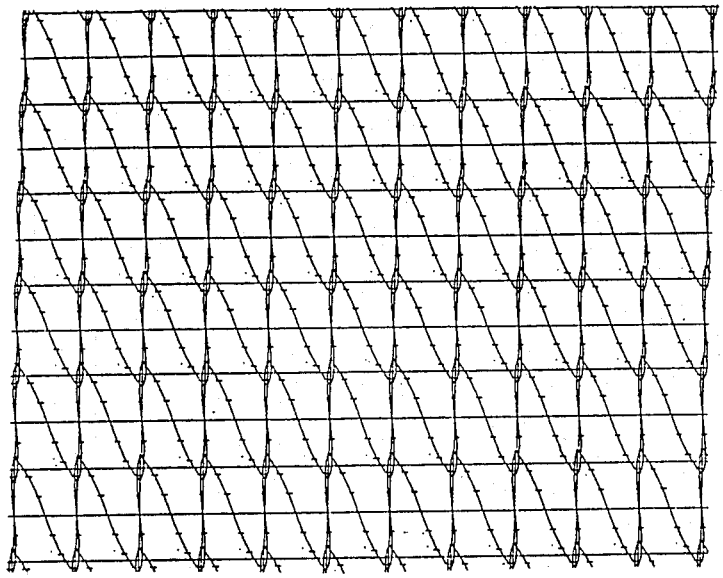

A pseudo square wave can be generated by adding additional sinisoudal modulation on the horizontal carriage motion that is synchronous and phased with the intra-dot scanning as shown in Fishbeck U.S. Pat. No. 4,349,828. A pseudo sawtooth wave can be generated by canting the motion of the jewel so the intra-dot scanning cancels the horizontal motion during half of the scan as shown in FIG. 38.

The vertical scanning motion is given to the end of the pins by moving the pin support 10 plus or minus 5 mils at a frequency of 1875 Hz as illustrated in FIGS. 1A and 1B. The mounting of the printhead 10 is made resonant at or near 1875 Hz to minimize the driving power. This frequency is derived by subdividing the matrix pulses that determine the matrix points and is phase adjusted so that one of the matrix pulses is synchronized with the top of the sign wave. It is also important that the separation of the two rows of pins in FIG. 1A is an exact multiple of the intra-dot scanning period.

Alternately, the entire print mechanism can be moved so as to give the desired motion to the end of the pins either by rotating the mechanism or moving it vertically as an alternate to moving the pin support 10.

Figure 32:
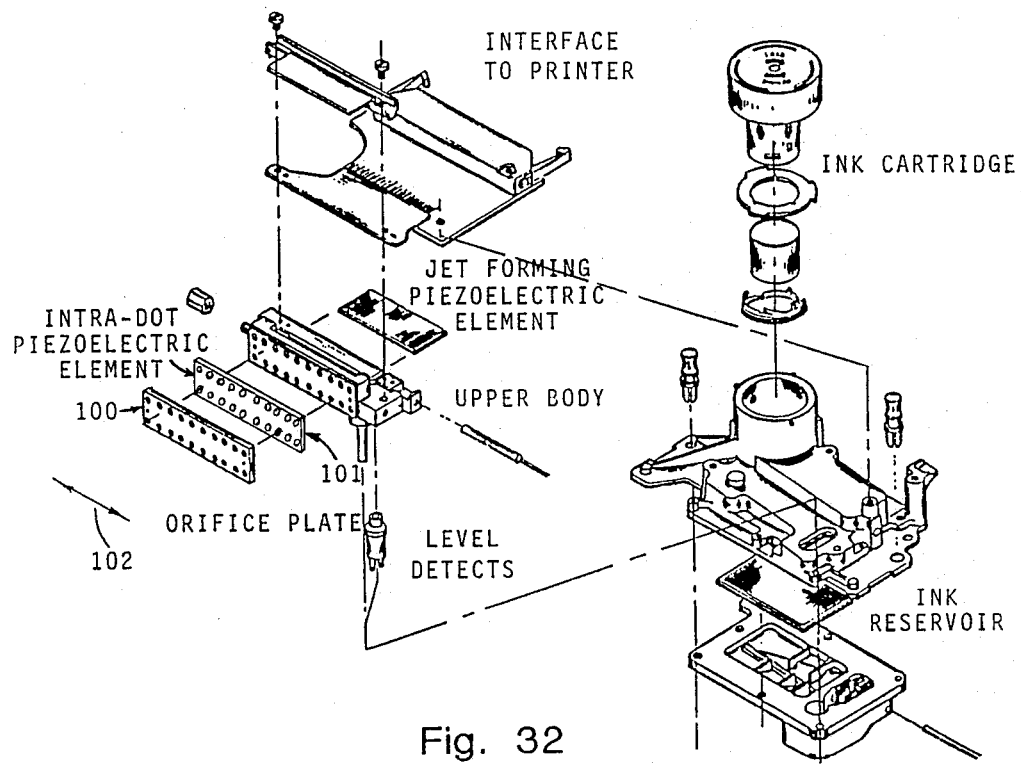
FIG. 32 shows the application of the invention to an ink jet system.

While dot matrix printing using print wires has been described above, the invention is equally applicable to ink jet printers of the type described in "Printout", Vol. VIII, No. 3, March, 1984. In this case the jet nozzle assembly is oscillated to achieve the transverse scanning motion superimposed on the major scanning motion as shown in FIG. 32.

Scaling with Dot Size

The dot size used determines the spacing between pins permissible. A preferred high quality dot size we have used is 14 mils. If this is used with the scanning pattern shown in 3C, 3D and 3E, the vertical spacing between pins needs to be 1/96". On the other hand if the dot size is increased to 16 mils or larger, the vertical dot spacing can be 1/72". The quality will be considered better with the 14 mil dots, however, more pins will be needed and the speed for a given number of pins will be slower.

Effective Matrix Size

The effective matrix size illustrated in FIG. 2 is 960/inch horizontally and somewhat variable in the vertical direction, but worst case is 300/inch vertically. This is somewhat better vertically than a 24 pin head (216/inch vertically) and equivalent to 4 pass 9 pin multipass printing (288/inch vertically).

Figure 6:
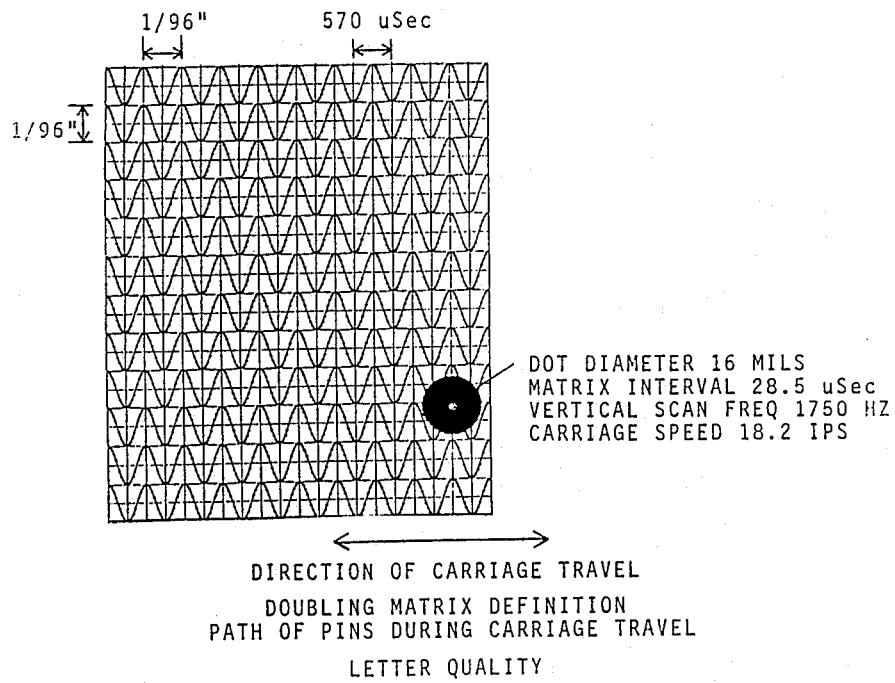
FIG. 6 is similar to FIG. 2 but with twice the number of print points.

However, it is relatively easy to increase the matrix definition with no reduction in printing speed, but minor penalities in electronic cost by doubling the number of firing points as shown on FIG. 6. This gives a matrix size of 1920/inch horizontally and 600/inch vertically. The only limitation to increasing the definition with synchronized intra-dot scanning or multipass printing is that the dot size is the minimum line width. 16 mil dots seem to be optimum for draft characters and have good acceptance for letter quality although some people prefer 12 mill dots for letter quality characters. When used for graphic applications, a 10 or 12 mil dot is probably preferable.

Alternate Vertical Size Scan

Figure 7:
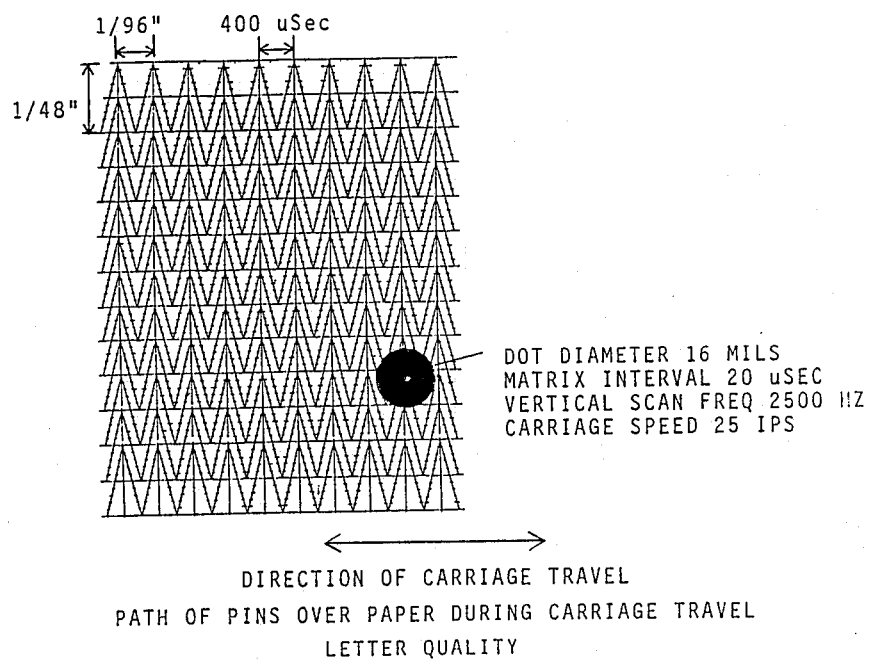
FIG. 7 is similar to FIG. 5 but shows overlapping triangular scans with the scan cycle being less than the dot diameter in the horizontal direction and greater than the dot diameter in the vertical direction, this will give letter quality.

There is an improved variation of this invention if deflection of the scan is increased to plus or minus 10 mils as shown in FIG. 7. The matrix of FIG. 7 can be increased to 20 points per cycle. This gives a matrix size of 1920/inch horizontally and 480/inch vertically. This provides a hybrid inter-dot and intra-dot scan. It can be seen that the possible matrix points are a lot more uniform than in FIG. 5. When printing letter quality, the carriage speed can be increased to 25 inches/sec. because of the increased interleaving. The refire time of 400 Seconds is one complete vertical scan. This increases the letter quality speed to 260 cps for 10 pitch and 325 cps for proportional Time Roman. FIG. 8 shows the same letters as FIGS. 3A and 3B and, as can be seen, there is no deterioration in quality.

The only problem with the scan cycle in practice is that we get dot smear due to the dwell time of the pins on the paper with the best printhead technology today. As printhead technology gets better in this respect, this will be a very useful system.

This much scanning amplitude is very useful in other technologies such as ink jet, lasers, ion deposition and CRT monitors or television.

Figures 8A, 8B, 9:
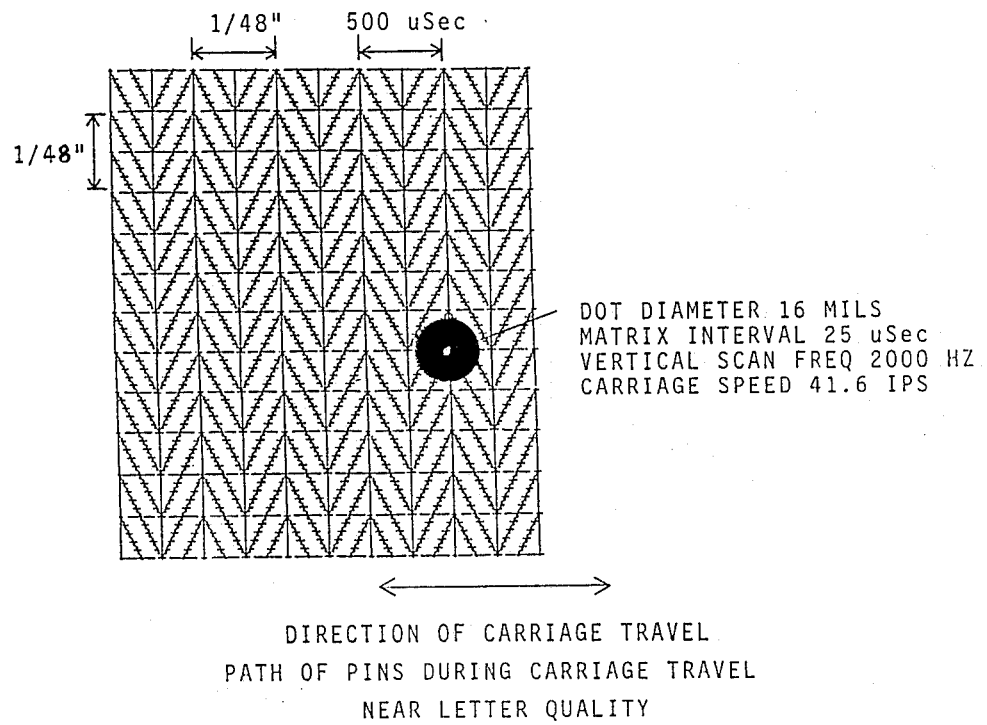
FIGS. 8A and 8B show the printing of a word with the scan of FIG. 7.
FIG. 9 is similar to FIG. 7 with the horizontal scan being expanded 2:1 to give near letter quality (NLQ) and shows inter dot scanning in both the horizontal and vertical directions.
Figure 10A:
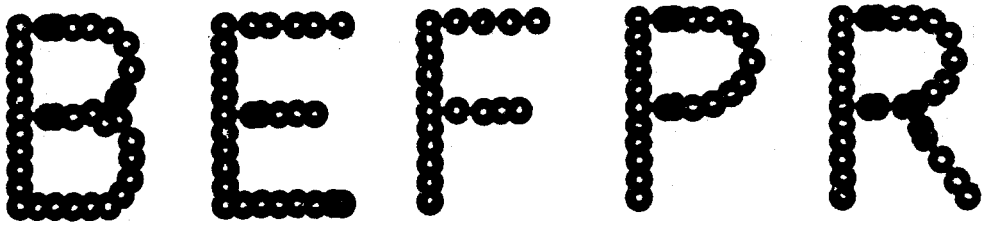
FIGS. 10A and 10B show the printing of a word with the scan of FIG. 9.
Figure 10B:
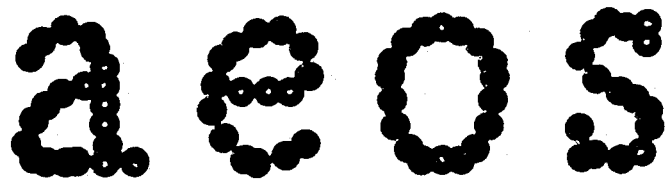

FIG. 9 shows the matrix positions when the carriage is speeded up to 41.6 i.p.s. with plus or minus 10 mils deflection. This gives a matrix size that is 960/inch horizontal and 480/inch vertically. This is a pure inter-dot scan in both directions. FIGS. 10A and 10B show Near Letter Quality (NLQ) letters using this matrix which would be printed at 416 cps (10 pitch) and 520 cps (proportional). The only limitation is that there is a reduced number of vertical positions (i.e., 2) that can print horizontal lines. One must therefore reduce the point size of NLQ or increase the number of pins by one or two pins.

FIG. 11 shows the matrix positions when the speed is increased up to 83.2 i.p.s. This gives a matrix size of 480/inch horizontally and vertically. FIGS. 12A and 12B show 48 dpi draft characters which would be printed at 832 cps (10 pitch). The quality of these draft characters is about the same as conventional 48 dpi draft characters. The only limitation is the reduced number of vertical positions that can print horizontal lines. One must either reduce the point size of draft letters or increase the number of pins.

As can be seen, the complete scanning cycle is longer than the dot diameter (inter-dot scanning). However, this embodiment shares with the intra-dot scanning system the common feature of the transverse scan imposed on the major scanning motion. When using inter-dot scanning it is necessary to have the scanning cycle complete within about 3 or 4 diameters, otherwise the ability to achieve desired qulity of printing will be lost. Preferably the inter-dot scanning is complete within 1½ to 2 cycles.

Figure 13:
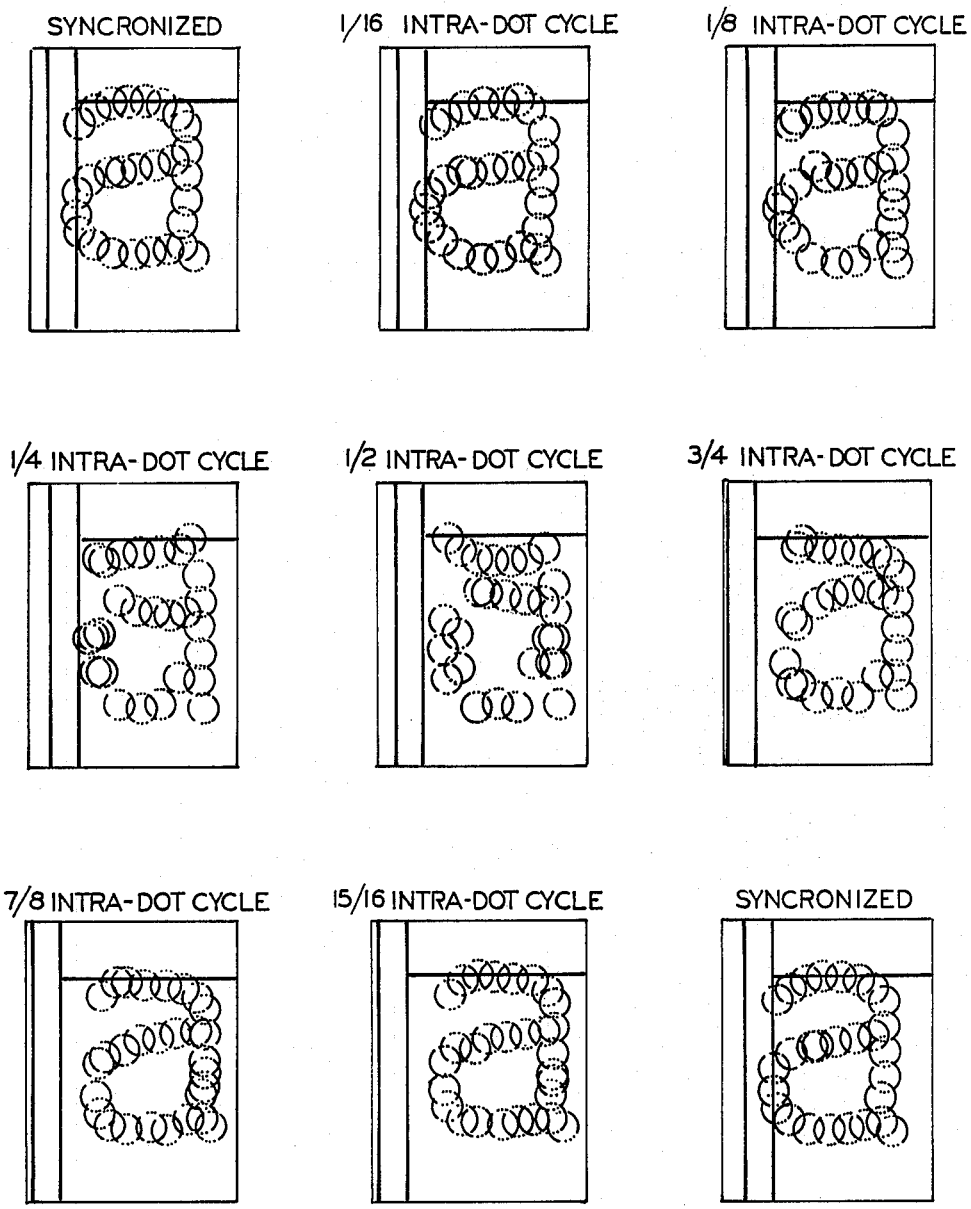
FIG. 13 shows a computer simulation of the deterioration of print quality with synchronization errors.

The Intra-Dot Scanning must be properly synchronized in order to obtain the proper quality characters. If they are not synchronized properly, the characters get very distorted even to the point of being unrecognizable as illustrated in FIG. 13. It is easy to see from this computer simulation that the intra-dot scanning must be synchronized better than 1/16th of an intra-dot cycle to selected positions on the horizontal line.

This synchronization problem is complicated by the resonant mounting of the jewel which is required to keep the driving power and actuator for intra-dot scanning reasonable. The Q of the resonant mount turns out to be around 10 which means the intra-dot scanning must be started 5 to 10 cycles before printing in the right phase to synchronize with the first printed character.

Figure 14:
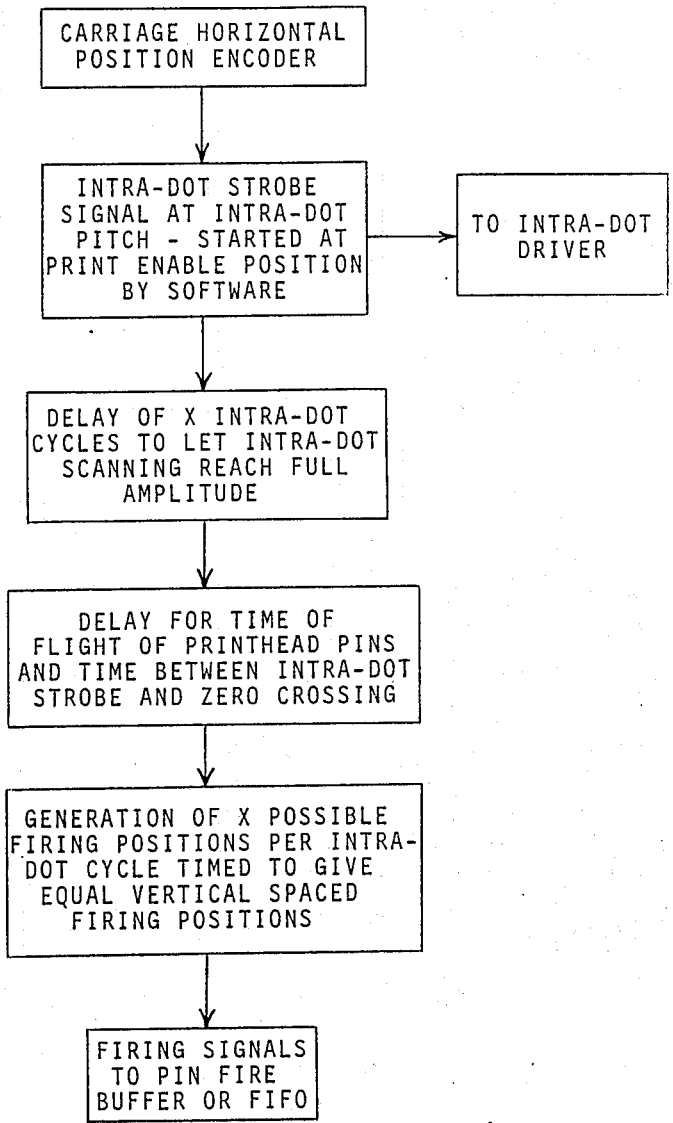
FIG. 14 shows one method of intra-dot synchronization in accordance with the present invention.
Figure 15:
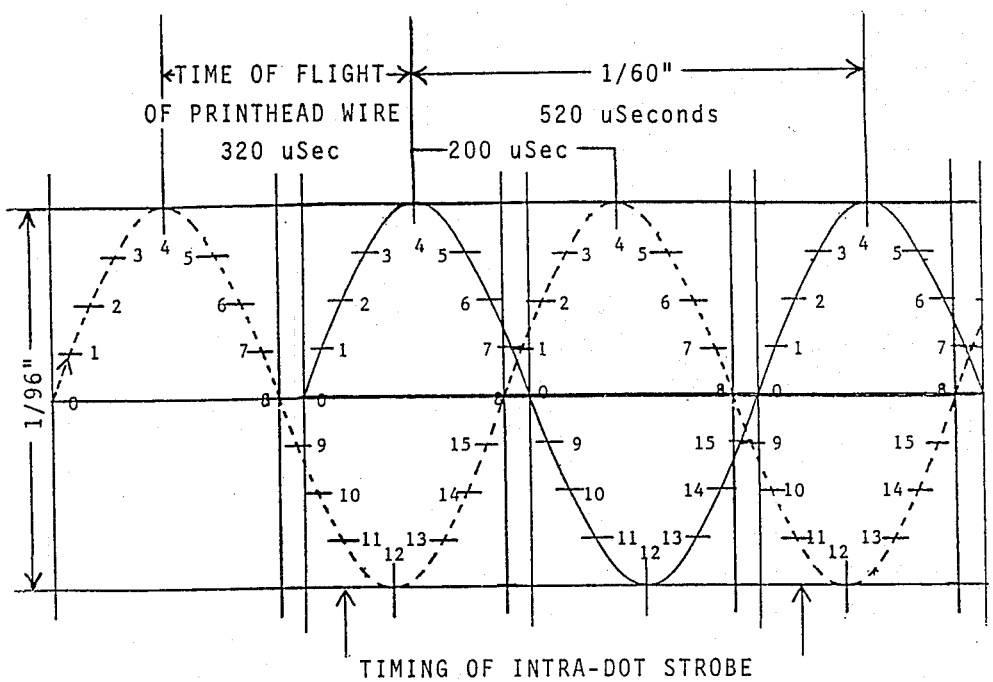
FIG. 15 shows the relationship of the firing signals to the actual path of the printhead using the synchronization system of FIG. 14.

There are two methods of accomplishing this synchronization:

The first method is illustrated by FIGS. 14 and 15. Referring to FIG. 14, the intra-dot strobe start is derived from horizontal position encoder carefully calculated so that intra-dot scanning is up to full amplitude and in phase with first print character. There are X cycles taken to get up to amplitude plus the time difference of intra-dot strobe and zero crossing plus period of intra-dot cycle minus the time of flight of pin from pin strobe to paper. At this time we generate a series of 15 pulses representing the difference in possible firing positions as shown in FIG. 15. This signal is used in connection with pin fire buffer to determine when to fire the pins.

The print enable position described in FIG. 14 is the period of intra-dot scan in mils plus the time difference between zero crossing and the intra-dot strobe in mils before the desired print position.

Figure 16:
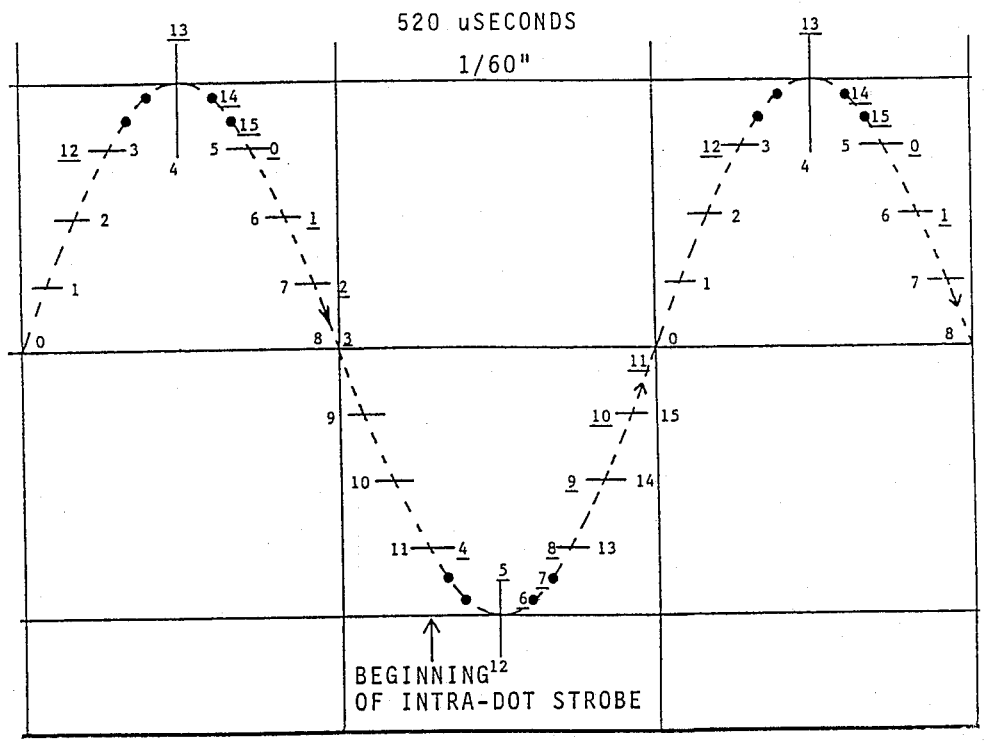
FIG. 16 shows the relationship of the time of firing of pins and their impact on paper using the second method of synchronization.

The second method of synchronization is to utilize the horizontal encoder as shown in FIG. 16. For example, if we use a 1440/inch horizontal encoder we get 24 increments in one 1/60" intra-dot cycle. This could be used for firing the pins, but 4 increments near the top of the cycle and 4 increments near the bottom of the cycle give too much vertical resolution. All the increments could be used, but our pin fire buffer would be 50% larger than necessary and unequal vertical resolution would result.

Figure 17:
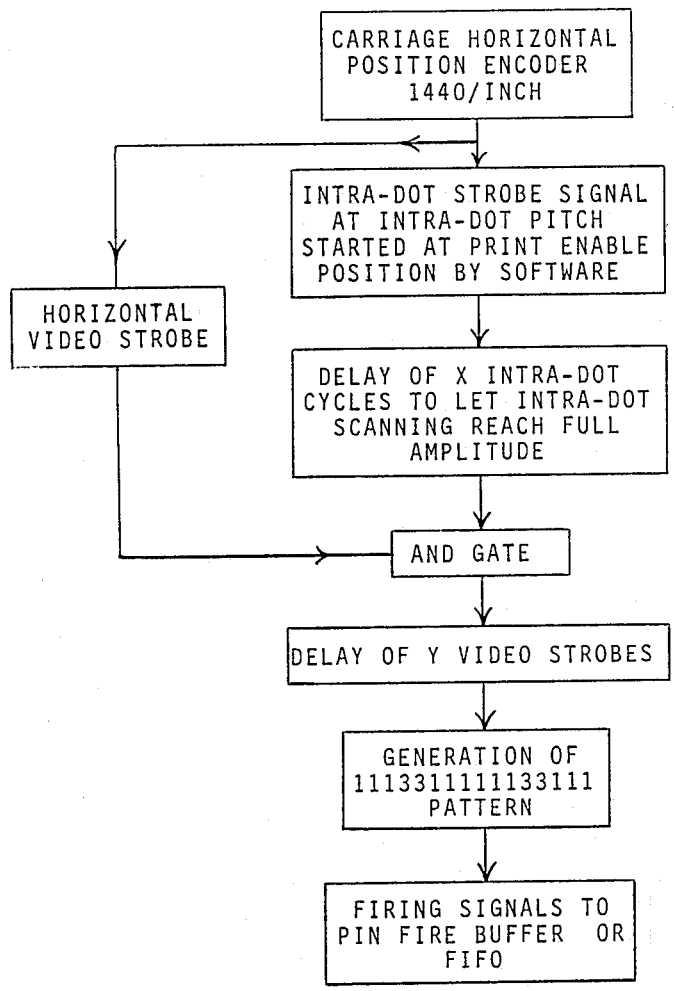
FIG. 17 shows a second method of intra-dot synchronization.

By using the method shown in FIG. 17 and as illustrated by FIG. 16, we have a very good solution to the problem. The numbers below the sine wave are the positions on the paper, while the numbers above the sine wave are the times for firing the pins to impact at the corresponding numbers below the line. The time delay in encoder intervals is the time of flight of pin in microseconds divided by the horizontal encoder interval in microseconds. You will notice that we get a firing pattern of 1, 1, 1, 3, 3,1, 1, 1, 1, 1, 1, 3, 3, 1, 1, 1 horizontal encoder intervals. This is an approximate solution, but the error is very small.

This is a good solution for 8 vertical intervals per intra-dot scan. There are equally good ones for 6, 4 and 2 intervals. The horizontal encoder interval must be a submultiple of intra-dot period in all cases.

(1) One must keep a 3 to 2 or multiple for 8 vertical intervals per intra-dot cycle and use a 1113311111133111 firing pattern. The maximum vertical error is 0.3 mils.
(2) One must keep a 9 to 4 or multiple for 6 vertical intervals/intra-dot cycle and use a 2,2,5,5,2,2,2,2,5,5,2,2 firing pattern. The maximum vertical error here is 0.17 mils.
(3) One must keep a 3 to 2 or multiple for 4 vertical intervals/intra-dot cycle. The firing interval 1,2,2,1,1, 2,2,1 firing pattern. There is no vertical error in this case.
(4) One must keep a 9 to 4 or multiple for 3 vertical intervals/intra-dot cycle and use 7,4,7,7,4,7 firing pattern. The maximum vertical error is 0.06 mils.
(5) One must use a 2 to 1 or multiple for 2 vertical intervals/intra-dot cycles and use 1,1,1,1 firing pattern.

Speed Control with Resonant Intra-Dot Scanning

A resonant intra-dot scanning needs a smoother, more accurate speed control than regular printer design. It is important that the speed variations do not vary any faster than the resonant circuit can handle without changing amplitude. Since one tends to control the speed of the motor, one must use a smooth proportional control as well as a rugged mechanical system between the motor and carriage.

Serial Thermal Printer Using Synchronized Intra-dot Scanning

A serial thermal printer is implemented in a very similar fashion to the serial impact dot matrix printer. Several examples of such printers that can be modified in accordance with the present invention are shown on page 3 of the Kyocera brochure "Thin Film Thermal Printheads", CAT/1T8504FTK/2192E, and page 4 of "Printout", Vol. VII, No. 12, December 1983 as well as "Printout", Vol. XI, No. 9, September, 1985. FIG. 1A can be modified to use such a thermal printer with twelve printing elements 12 being shown as mounted in two rows of six with the element centers 20 mils apart staggered so that the effective element spacing is 10 mils with the vertical sinusoidal scanning being plus or minus 5 mils with a carriage 10B motion of 10 mils and the printing elements producing a dot of 16 mils diameter (could be square). The intra-dot scanning could be triangular, square wave or any shape in-between, but sinusoidal or triangular is nearly optimum. Assuming the refire speed was 6 milliseconds, the carriage speed would be 13"/second. The printing speed for high quality letters (10 pitch) would be 130 cps which would be the same as a 36 pin printhead. The savings would be in using a 12 pin printhead with the resulting elimination of the element drivers and electronics. In the case of a thermal printhead, however, the entire printhead would need to be rotated or moved vertical to obtain the desired scanning motion. The same variation of scanning can be used as shown in FIGS. 4 through 11.

Figure 18:
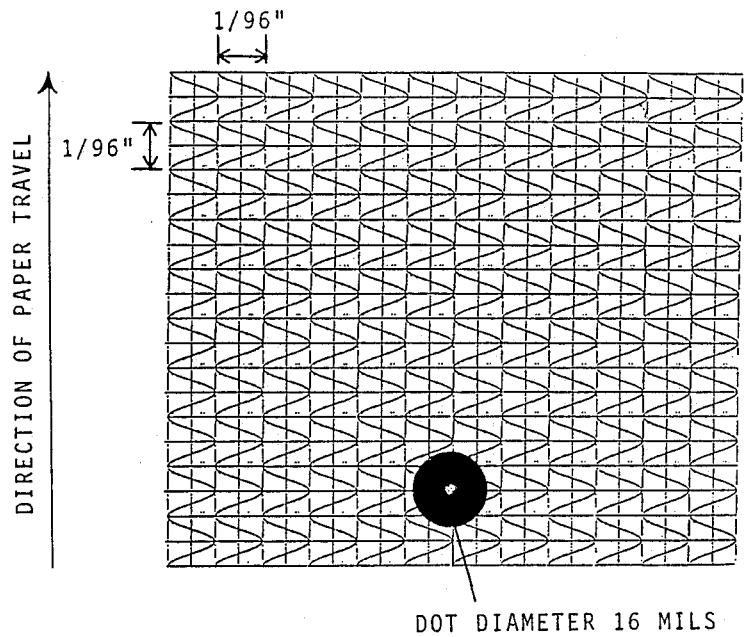
FIG. 18 is somewhat similar to FIG. 2 showing the path of 12 print elements (out of a possible 1000 elements) only but illustrates the cyclic variation (in this case a sine wave) applied horizontally instead of vertically to a row of printing elements which extend across the path of paper travel.
Figure 19:
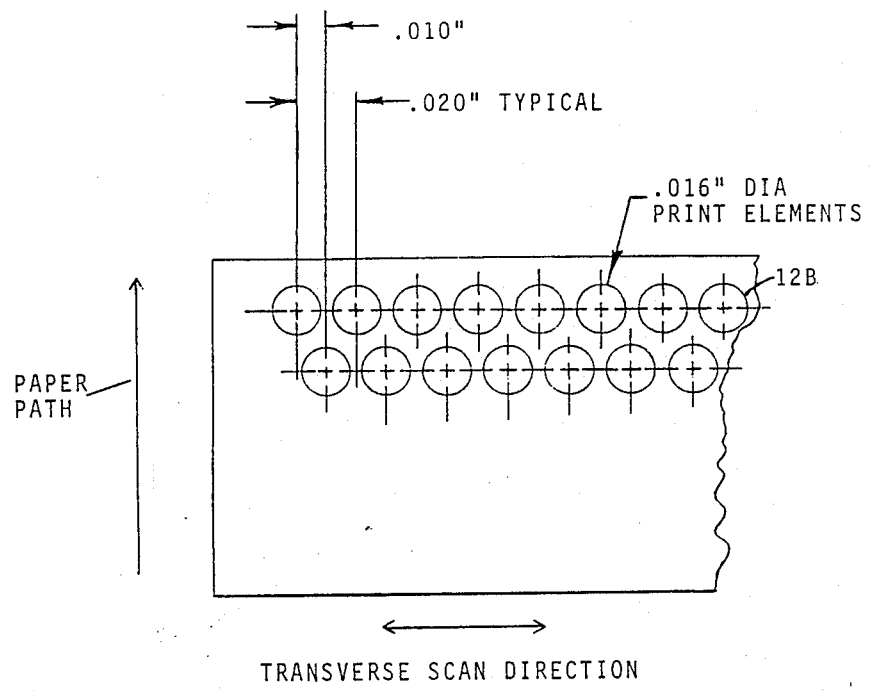
FIG. 19 is a schematic diagrammatic view of a portion of a printhead which can be used for a thermal or electrostatic printer.

Line Thermal Printer or Electrostatic Printer Using Synchronized Intra-dot Scanning A line thermal printer utilizes synchronized intra-dot scanning by imparting a sinusoidal horizontal motion to the printhead as the paper is fed vertically giving a path to the printing elements as shown in FIG. 18. This sinusoidal motion has a peak to peak amplitude between $\frac{3}{4}$ and 3 time the size of the dot created by the printing element. The printing elements would be 2 rows of printing elements 12B as illustrated in FIG. 19, only a portion of the 1000 printing elements being shown. An example of such a line thermal printer that can be modified in accordance with the present invention is shown on pages 4 and 5 of the above Kyocera brochure. The printing elements would produce a dot 16 mils in diameter (could be square). The effective spacing of the printing elements is 10 mils and the paper advances 10 mils thru one sinusoidal cycle. The effective matrix shown in FIG. 18 is 300/inch horizontally and 1000/inch vertically.

Assuming the refire speed is 8 milliseconds, the paper speed would be 1"/second and the print speed would be 360 lines/minute. The savings would be the reduction in printing elements from 2000–4000 elements to 1000 elements for a 10" printline.

Electrostatic Printer

The electrostatic printer operates the same way. The printhead would be constructed as in FIG. 19. An example of such a printer that can be modified in accordance with the invention is shown in the Versatek Bulletin No. 525-2, April, 1984, describing its V-80 printers. The printhead would have a sinusoidal motion as the paper is fed vertically so as to give the printing elements a path as shown on FIG. 18. The printing elements would produce dots of 16 mils in diameter. The effective spacing of the printing elements is 10 mils and the paper advances 10 mils thru one sinusoidal cycle. The effective matrix shown in FIG. 18 is 300/inch horizontally and 1000/inch vertically.

The intra-dot scanning could be triangular, square wave or almost any shape in-between, although sinusoidal or triangluar is nearly optimum.

The major saving would be the reduction in elements and their associated drivers from 2000–4000 elements and drivers to 1000 elements.

In both the thermal line printer and electrostatic printer, the dot size could be made smaller which would cause an increase in the number of elements as illustrated in the serial impact printer.

Impact Dot Matrix Line Printer Using Intra Dot Scanning

Figures 21, 22A, 22B:
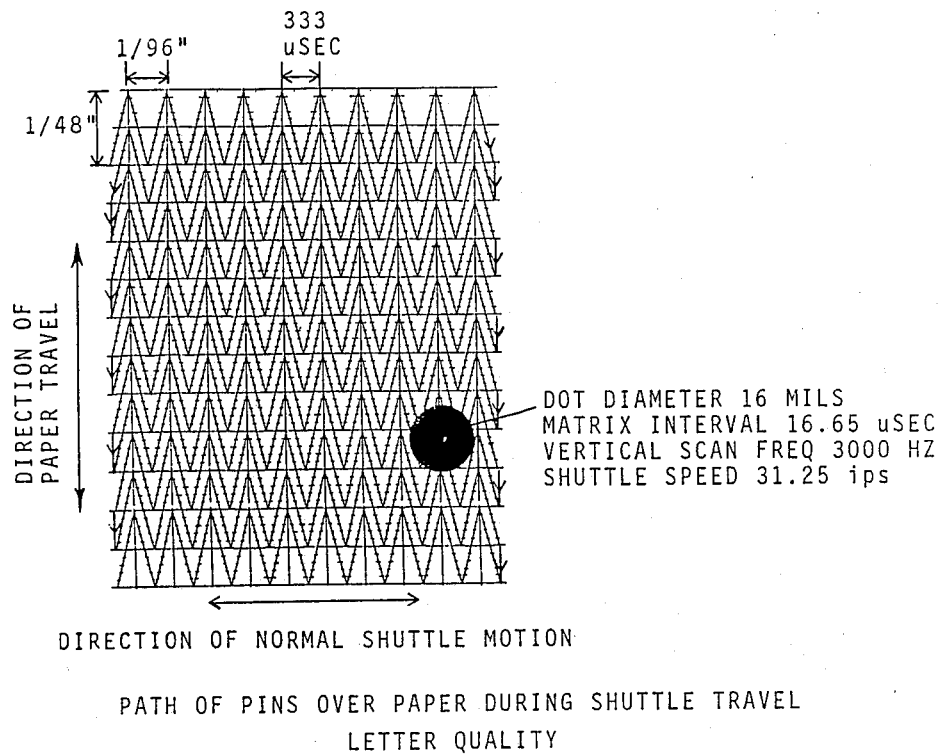
FIG. 21 shows intra-dot scanning applied to an intra-dot impact line printer.
FIGS. 22A and 22B show the print of a word with the scan of FIG. 21.

Intra Dot Scanning can improve the letter quality printing by a factor of two over conventional methods in addition to improving the vertical matrix size. The path of the scanning matches the normal horizontal scanning of the shuttle printhead. The arrows shown in FIG. 21 occur during normal line feed. The letter quality printing quality is identical to that realized with a 12 pin serial printer with intra dot scanning and is shown in FIGS. 22A and 22B. In a similar fashion to FIGS. 9 and 11, near letter quality printing and draft printing can be obtained.

As can be seen by tracing the arrow in FIG. 21 showing the path of a single dot creating means, the oscillation is sufficiently great so that a series of dots created in one horizontal motion of the shuttle can provide a series of spaced dots. On the return motion of a shuttle, the dots between those dots created on the first pass can be filled in during the return stroke. This effectively doubles the speed at which the shuttle can be moved to obtain the same quality of printing.

Figure 20:
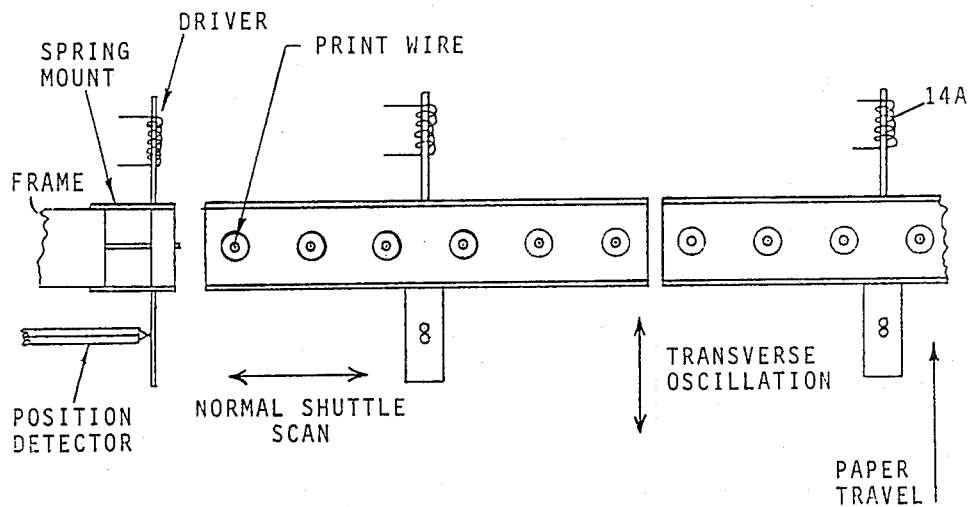
FIG. 20 is a schematic diagrammatic view of a vertical scanning mechanism for a line impact printer.

One method of producing the vertical scan is shown in FIG. 20. Multiple drivers 14A drive jewels that guide 6 pins. These elements are repeated for the full width of the printhead. Alternately, a motor with multiple cams drives the multiple pins in a triangular or sinusoidal fashion.

In summary, the advantages of intra dot scanning dot matrix to impact line printers is that letter quality printing is doubled in speed and near letter quality printing and draft printing is nearly doubled. Also the intra dot scanning allows the printer to compensate for continuous paper motion, eliminating the rapid paper motion at the end of each shuttle motion. This is accomplished by modifying the matrix patterns like FIG. 21 to take into account continuous paper motion. Different character PROMS are used for each character position and directions (only 4 combinations in 68 pin printer). When this feature is used, throughput is increased as much as 50%. For example, a 68 pin (13.6" line length) printer could print 2300 lines/minute while a 12 pin (8" line length) printer could print 730 lines/minute. It also greatly reduces the cost of the paper handling mechanism in the printer.

Printer Throughput

As printhead speed increases, it has become important to look at throughput of the printer, such as lines per minute or pages per minute. Characters per second as quoted by most printer manufacturers does not take into account the turnaround time of the carriage or line feed time, both of which seriously affect throughput. Line printers, such as the dot matrix shuttle or band printers, give their output in lines per minute.

A figure of merit in comparing printer design efficiency is throughput in lines per minute divided by number of lines (for given print quality, DPI, and print line length).

Dot Matrix Line Printers

The dot matrix shuttle printers (16, 34, 68 pins) use a sinusoidal motion of 0.2" to 0.8" and have been to date considered quite efficient from throughput standpoint. However, these printers use about 30% to 50% of the time not printing on the end of the sinusoidal stroke while the paper is advanced up to one dot width. Furthermore, there is up to two to one speed variation during the printing cycle which is inefficiently using the printhead speed. This is illustrated by FIG. 23. Other disadvantages are:

(1) Noticeable to annoying vibration felt or heard by the customer due to the shuttle motion or expensive enclosures are required.
(2) Lines per minute is independent of the print line printed. A line of 2" takes as long as a 13" line.
(3) The printhead pins on the left hand side of the printhead receive most of the wear and consequently fail first.
(4) The shuttle mechanism has been expensive, raising the price of the printer mechanism.

Figure 24:
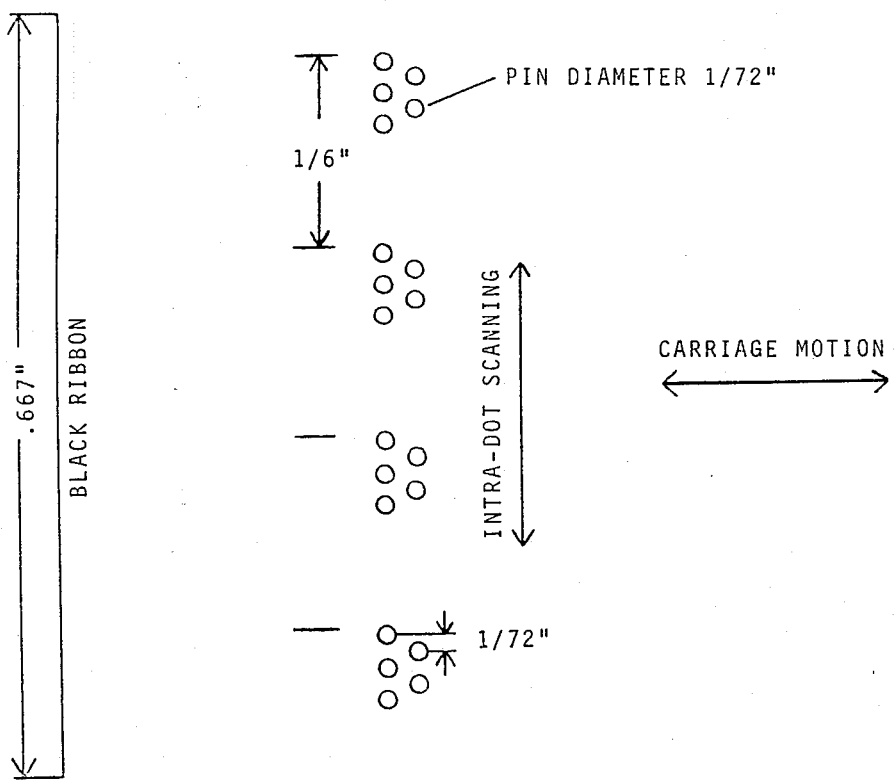
FIG. 24 shows a multiline print head which has been modified to incorporate intra-dot scanning in accordance with the present invention.

In draft, these printers have a figure of merit of 9 in comparison to 25 to 26 with multi-line Intra-Dot as illustrated in FIG. 24. Throughput for a FIG. 24 multi-line printer is shown in Table I.

TABLE I

Intra-Dot Printing with Multi-Line Hybrid Printheads
5 Pin Modules - Vertical Pin
Spacing 1/72" - Module Spacing 1/6"

|  | 1 Line | 4 Lines | 8 Lines |
|---|---|---|---|
| LQ Prop | 100 cps | 400 cps | 800 cps |
| 10 pitch | 80 cps | 320 cps | 640 cps |
| NLQP Prop | 200 cps | 800 cps | 1600 cps |
| 10 pitch | 160 cps | 640 cps | 1280 cps |
| Draft 10 pitch | 385 cps | 1540 cps | 3080 cps |

|  |  | Total Pins | Lines/ Minute | Pages/ Minute | Figure of Merit |
|---|---|---|---|---|---|
| THROUGHPUT - 7" PRINT LINE | | | | | |
| LQ | 1 Line | 5 pins | 62 Lpm | — | 12.4 |
| 120 dpi | 4 Lines | 20 pins | 234 Lpm | 4.3 ppm | 11.7 |
|  | 8 Lines | 40 pins | 436 Lpm | 8.0 ppm | 10.9 |
| NLQ | 1 Line | 5 pins | 124 Lpm | 2.3 ppm | 24.8 |
|  | 4 Lines | 20 pins | 442 Lpm | 8.2 ppm | 22.1 |
|  | 8 Lines | 40 pins | 777 Lpm | 14.4 ppm | 19.4 |
| Draft | 1 Line | 5 pins | 264 Lpm | 4.9 ppm | 53 |
| 50 dpi | 4 Lines | 20 pins | 836 Lpm | 15.5 ppm | 42 |
|  | 8 Lines | 40 pins | 1380 Lpm | 25.6 ppm | 35 |
| THROUGHPUT - 13.2" PRINT LINE | | | | | |
| NLQ | 1 Line | 5 pins | 70 Lpm | 1.3 ppm | 14 |
|  | 4 Lines | 20 pins | 262 Lpm | 4.9 ppm | 13.1 |
|  | 8 Lines | 40 pins | 485 Lpm | 9 ppm | 12.1 |
| Draft | 1 Line | 5 pins | 154 Lpm | 2.9 ppm | 31 |
| 50 dpi | 4 Lines | 20 pins | 536 Lpm | 9.9 ppm | 27 |
|  | 8 Lines | 40 pins | 944 Lpm | 17.5 ppm | 23.6 |

18 to 24 Pin Printheads

The conventional 18 to 24 pin printheads are designed for NLQ or LQ printing and are very inefficient when it comes to draft or data processing quality. Some 18 pin printheads go from an "offset" to "in line" pin arrangement to get around this problem.

The 24 pin printhead is really a hand me down from the Japanese Kanji printers and are ideal for the narrow strokes of the complicated Kanji letter. These narrow strokes (10 mils) are too light for the non-Asian characters which want strokes 14 to 16 mils thick. In letter quality, the 24 pin printhead must go very slow to make two dots in 4 to 6 mils of travel to thicken the vertical strokes. In draft quality, it is very inefficient. The characters are too light and the pins are used very inefficiently.

In letter quality these printers have a figure of merit of 3 or 4 as compared to 10 to 12 with multi-line Intra-Dot printing.

In draft, these printers have a figure of merit of 8 or 9 vs. 40 or 50 with multi-line Intra-Dot as illustrated in Table I.

Multi-Printhead Serial

One better approach is to use 3 or 4 printheads spaced across the platen. This was originally done years ago in the Centronics 104 and recently with great success by Output Technology. Because the percentage of time used for carriage turnaround is reduced, the throughput is improved 15 to 20% over shuttle printers. The vibrational problem is greatly reduced as well.

Multi-Line Hybrid Printheads

Figure 25:
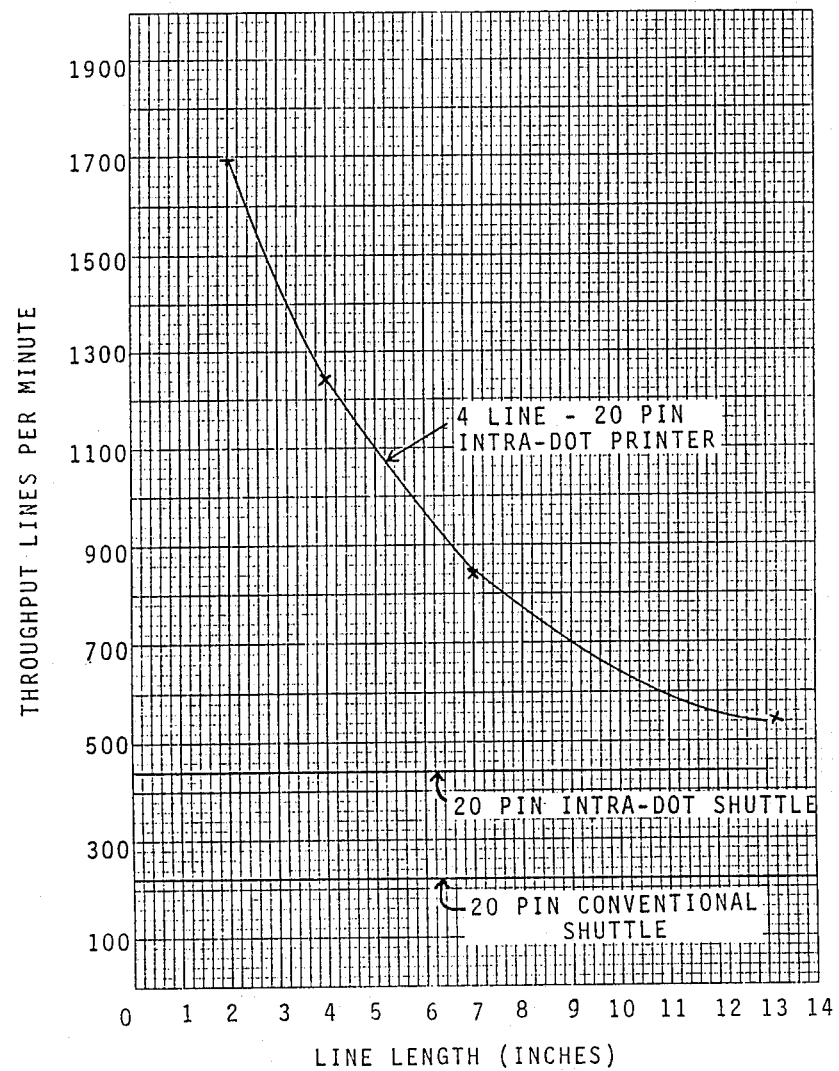
FIG. 25 shows a speed comparison of a 4 line-20 print intra-dot printer of FIG. 24 and a 20 pin intra-dot shuttle printer of the present invention along with a 20 pin conventional shuttle printer of the prior art.

An even better approach is to spread the total pins used (16–40) equally over 2 to 6 lines of text as illustrated in FIG. 24. This has a number of advantages.
(a) the printhead is completing a number of lines of text in one pass making much more efficient use of the carriage turnaround and line feed.
(b) Multi-line printheads use a serial printer mechanism which is much cheaper than the shuttle mechanism.
(c) The shorter the line, the higher the throughput as shown in FIG. 25. This is a big advantage to the user and should substantially increase the actual pages per minute produced by the average user.
(d) The printhead receives uniform usage whether we print short or long lines.
(e) The multi-line hybrid is ideal for Intra-Dot Scanning as it only needs one driver instead of up to a dozen for the line shuttle printer.

A New Generation of Impact Dot Matrix Printers

The combination of these three technologies-faster printheads-Intra-Dot Printing-Multi-Line Hybrid Printheads, gives us a new generation of impact dot matrix printing. The possibilities are almost endless. Tables I and II are a very brief summary of these possibilities.

TABLE II

Intra-Dot Printing with Multi-Line Hybrid Printheads
4 Pin Modules - Vertical Pin Spacing 1/96" - Module Spacing 1/6"

|  | 1 Line | 4 Lines | 8 Lines |
|---|---|---|---|
| LQ Prop | 67 cps | 267 cps | 533 cps |
| 10 pitch | 53 cps | 212 cps | 424 cps |
| NLQ Prop | 133 cps | 533 cps | 1066 cps |
| 10 pitch | 106 cps | 424 cps | 848 cps |
| Draft 10 pitch | 256 cps | 1026 cps | 2050 cps |

|  |  | Total Pins | Lines/ Minute | Pages/ Minute | Figure of Merit |
|---|---|---|---|---|---|
| THROUGHPUT - 7" PRINT LINE | | | | | |
| LQ | 1 Line | 4 pins | 43 Lpm | — | 10.8 |
| 120 dpi | 4 Lines | 16 pins | 164 Lpm | 3.0 ppm | 10.2 |
|  | 8 Lines | 32 pins | 312 Lpm | 5.8 ppm | 10.0 |
| NLQ | 1 Line | 4 pins | 86 Lpm | — | 21.5 |
|  | 4 Lines | 16 pins | 316 Lpm | 5.8 ppm | 19.8 |
|  | 8 Lines | 32 pins | 574 Lpm | 10.6 ppm | 17.9 |
| Draft | 1 Line | 4 pins | 189 Lpm | 3.5 ppm | 47 |
| 50 dpi | 4 Lines | 16 pins | 635 LPM | 12.0 ppm | 39 |
|  | 8 Lines | 32 pins | 1096 Lpm | 20.0 ppm | 34 |
| THROUGHPUT - 13.2" PRINT LINE | | | | | |
| NLQ | 1 Line | 4 pins | 46 Lpm | — | 11.5 |
|  | 4 Lines | 16 pins | 179 Lpm | 3.3 ppm | 11.2 |
|  | 8 Lines | 32 pins | 339 Lpm | 6.3 ppm | 10.6 |
| Draft | 1 Line | 4 pins | 107 Lpm | 2.0 ppm | 27 |
| 50 dpi | 4 Lines | 16 pins | 388 Lpm | 7.2 ppm | 24 |
|  | 8 Lines | 32 pins | 707 Lpm | 13.0 ppm | 22 |

Intra-dot scanning of the present invention can improve the performance of a laser printer as well as the other printers discussed.

Laser Printer Using Intra-Dot Scanning Case I

Keep the spot size the same, but use Intra-Dot Scanning to reduce the scan rate by factor of 2, 4, 8, etc. For example, if one is using a spot size of 4 mils for 300 lines/inch and you use the scanning system shown in FIG. 26, this reduces the scan rate by a factor of 2.

An advantage would be found in reducing the speed and tolerances on polygon deflectors, etc. The electronics are fundamentally the same except for interleaving of two scans together.

On the other hand, we could increase the speed by a factor of two with the same mechanical tolerances. This would require twice the laser power and twice the electronic speed.

Figure 29:
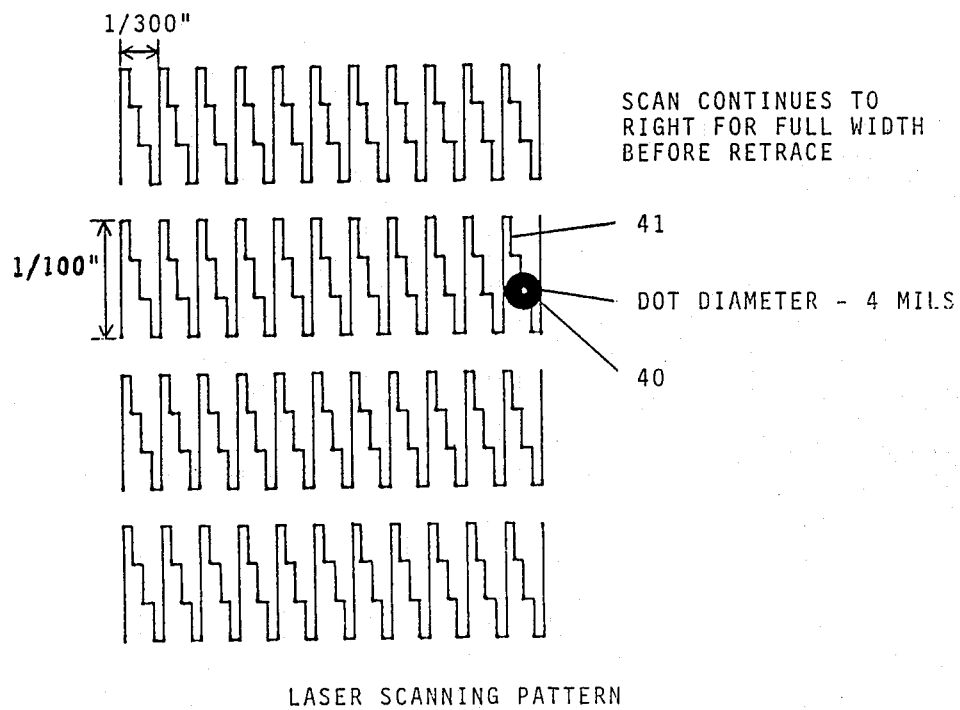

FIG. 29 illustrates a reduction of scanning speed of 4 to 1. This requires a accoustic optical deflection modulator instead of a vibrating mirror as in the previous case. Here again, the electronics are the same except that we must interleave four scans instead of two. In both cases, this would be built into the character fonts. The reduction in speed and tolerances would be four to 1.

On the other hand, we could increase the speed by a factor of four with the same mechanical tolerances. This would require four times the laser power and electronic speed.

Case II

Figure 27:
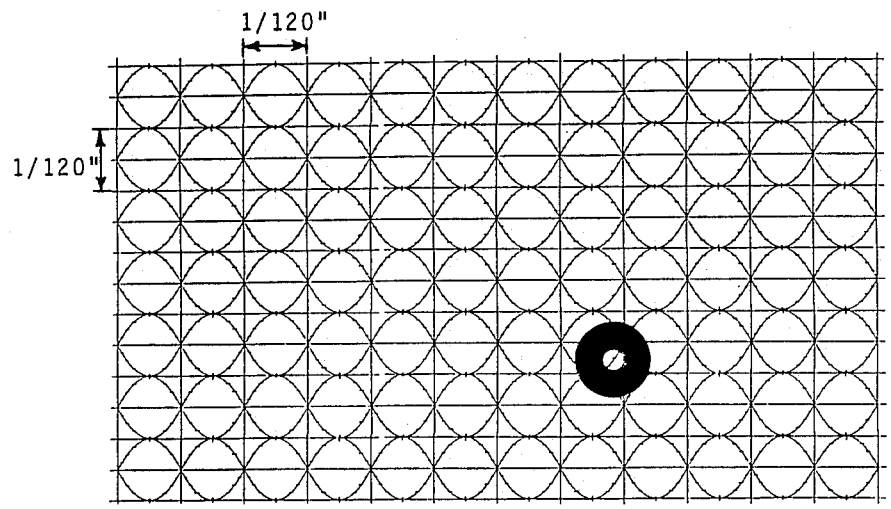

Increase the spot size to 8 to 10 mils, but increase the resolution to over 500 lines/inch. The scanning pattern is shown in FIG. 27. This is a similar scanning pattern over that used to produce the attached print sample using an intra-dot scanning serial impact printer.

If we reduce the spot size to 10 mils, we reduce our minimum line width to this number which is really not a problem.

The advantage of the larger spot size and intra-dot scanning is both increased speed as well as reduced electronics. The speed of the electronics as well as the speed of the mechanical components is reduced by the square of the spot size. Thus a 10 mil dot laser printer using intra-dot scanning and having the same output speed as a 300/inch laser printer and using the same laser would scan one tenth as fast, not counting intra-dot scan speed, its character ROM before compression would be one third the size, and its electronics in general would be one-tenth as fast.

Any specific design of a laser printer using intra-dot scanning can probably both increase the speed and quality as well as reduce the cost.

Light Emitting Diode (LED) or

Liquid Crystal Diode (LCD) Printer

Printers using Synchronized Intra-dot Scanning in LED Printers (such as produced by Ricoh or IBM), synchronized intra-dot scanning wuld have an advantage. An example of such a printer than can be modified in accordance with the invention is shown in "Printout", Vol. IX, No. 10, Oct. 1985. Two rows of LED's or LCD's are shown in FIG. 19. Each LED or LCD makes a dot on the drum of 16 mils diameter and the effective spacing is 1/96". The path the LED or LCD elements make on the drum is shown in FIG. 18 due to the sinusoidal motion of the LED elements that move plus or minus 5.0 mils sinusoidally as the drum moves 1/144". The effective matrix is 480/inch horizontally and 1500/inch vertically.

Figure 26:
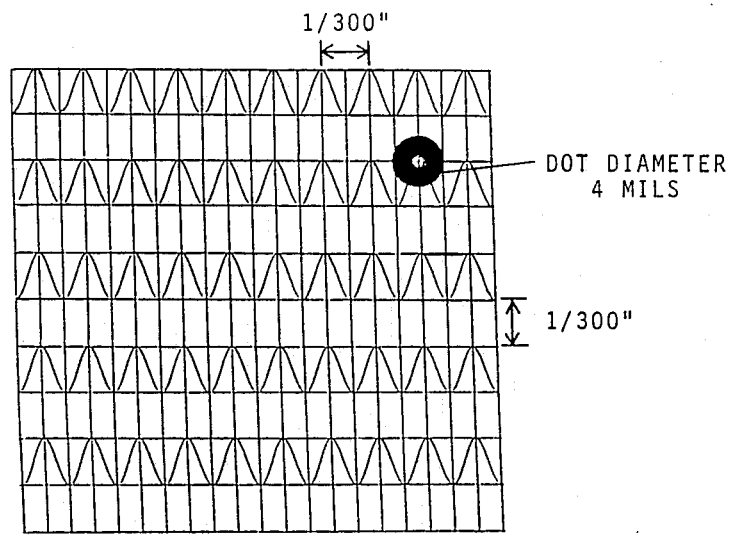
Figure 30:
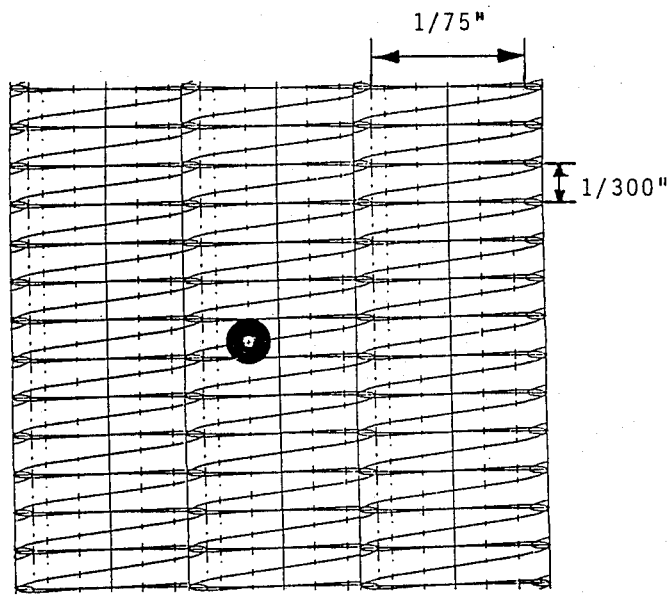
Figure 31:
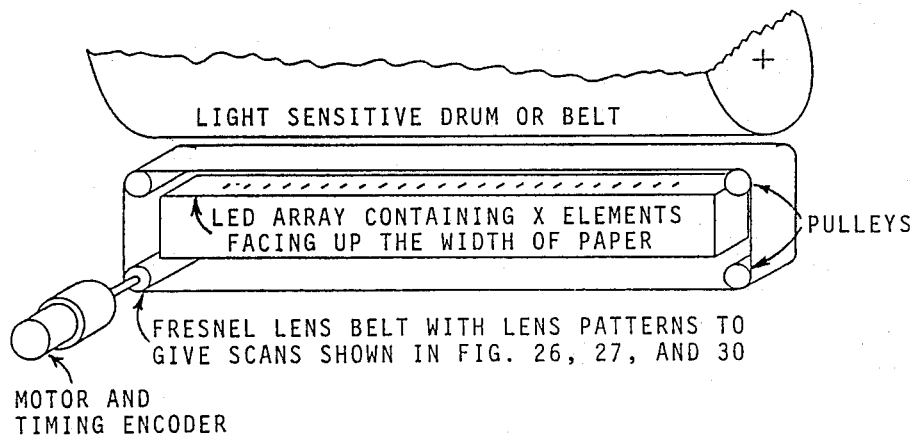
FIG. 31 illustrates a Fresnel lens belt which can be used to adopt the present invention to an LED printer.

A Fresnel type lens is used between the LED and LCD and is moved so as to obtain the modulations shown in FIGS. 26, 27 or 30. The advantages are increased speed or reduced cost due to smaller number of LED or LCD's required.

The advantage of this over conventional LED or LCD printers is that it uses ½ or ¼ the LED elements that conventional LED printers use for the same matrix definition. The printing speed would be increased by a factor of two or three.

The intra-dot scanning could be triangular, square wave or almost any shape in-between although sinusoidal is nearly optimum.

While the invention has been described initially in the context of its use in dot matrix printing, the basic principals involved can be equally utilized in image scanning as well as image printing, as discussed below.

Scanner for Graphic Input to Synchronized Intra-dot Scanning Printers

In order to input graphic data into synchronized scanning printers, it is necessary to scan the graphic data in exactly the same way as the dots are printed.

Scanner for Serial Dot Matrix Printer or Serial Thermal Printer

Using Synchronized Intra-dot Scanning

Figure 28:
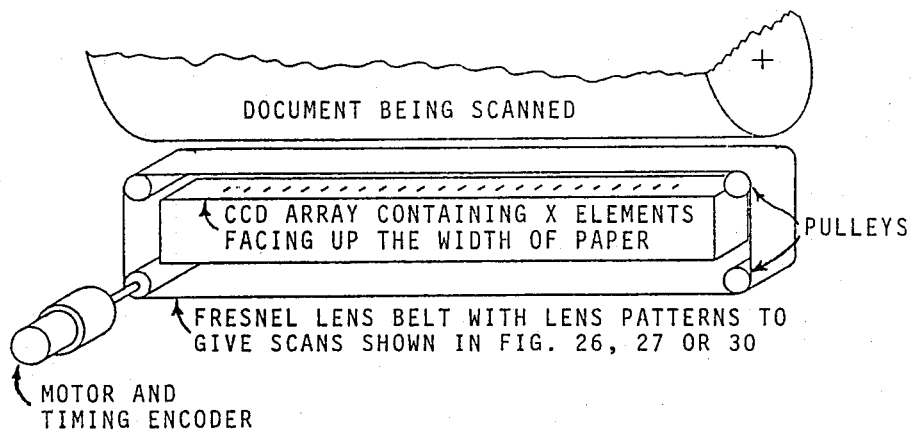
FIG. 28 illustrates a Fresnel lens belt for an optical scanner employing the present invention.

The scanning head consists of 12 or more elements arranged as in FIG. 1A. In this case the elements could be photo diodes, for example, rather than print pins. The elements are made to move vertically sinusoidally as the head moves horizontally so that the head scans plus or minus 5 mils as the head moves 1/96" mils horizontally as in FIG. 2. The scanning could be accomplished mechanically by moving or rotating the scanning head or it may be done optically by means of a frenel lens belt as illustrated in FIG. 28. The scanning can be done with a serial mechanism or line type scanning.

Input Scanning of Documents with Intra-Dot Scanning

When scanning a document, there is always an advantage in scanning in the same manner as it is going to be printed. With the advantages of intra-dot printing, this is one very good reason for scanning with intra-dot scanning. There are other considerable advantages of intra-dot scanning which we will now discuss.

Ordinarily, a document is scanned with a conventional raster scan. There are certain problems which affect the required scanning pixel size.

Figure 39:
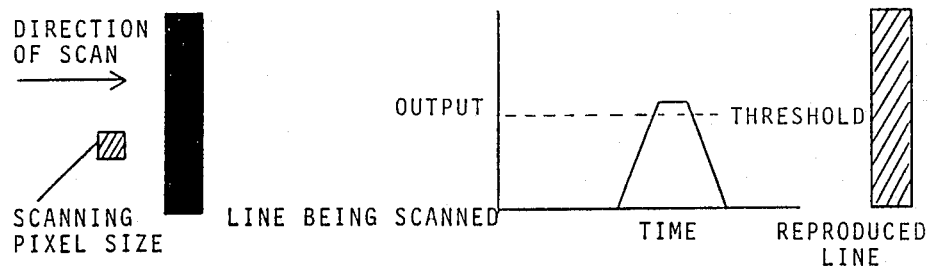
FIGS. 39 to 43 show the use of the present invention for scanning images.

FIG. 39 illustrates the non-intra-dot horizontal scanning of a vertical line and under these conditions, one can see that as long as the scanning pixel is smaller than line width, there is enough information to reproduce the line.

Figure 40:
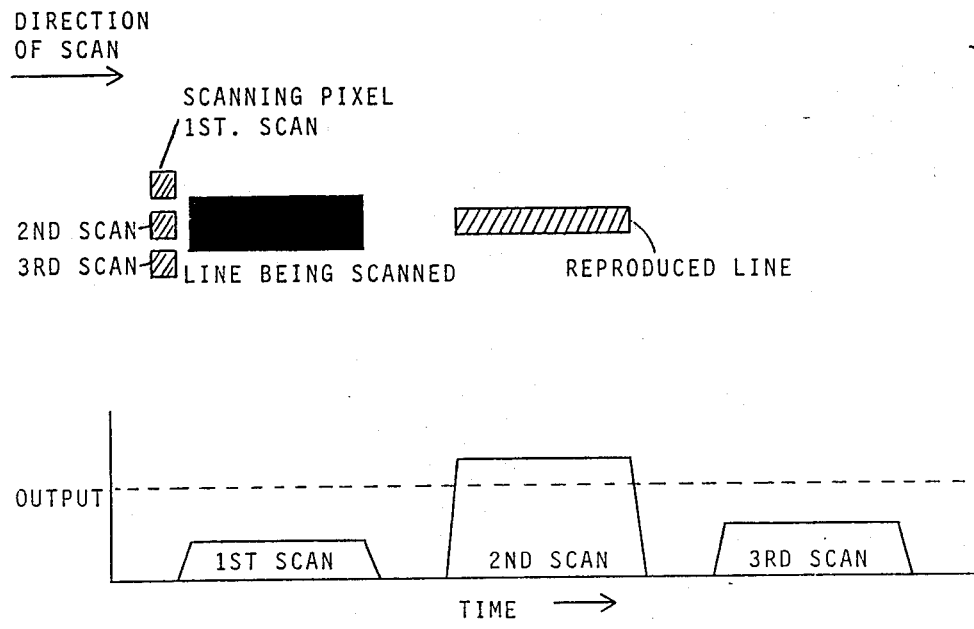

FIG. 40 illustrates the non-intra-dot scanning of a horizontal line and illustrates how, with conventional scanning, using a scanning pixel ½ the line width, the reproduced line is only ½ its original width. In fact, the horizontal line is reproduced decreased in width by the scanning pixel size. For this reason, we scan characters and documents with scanning pizel sizes that are typically ⅓ to 1/5 the line width. For example, with characters that have 15 to 20 mil stroke width, we use scanning pixels of 3 to 5 mils.

Figure 41:
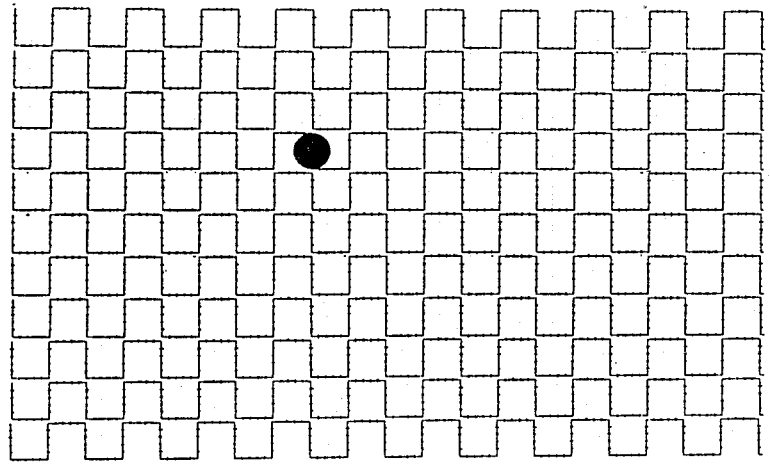
Figure 42:
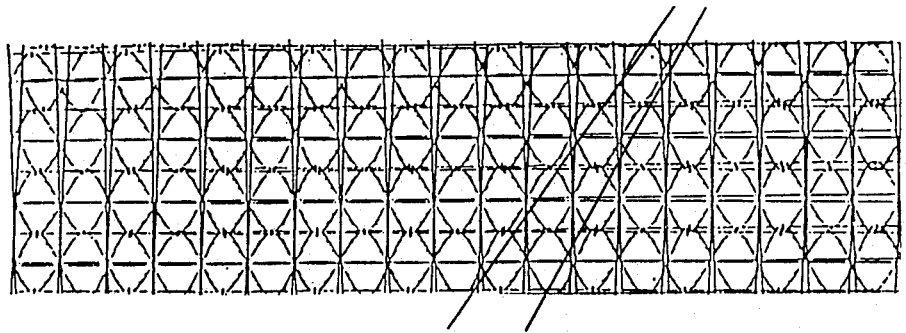

FIG. 41 illustrates an ideal scanning pattern using pseudo-square wave scanning. Here we see we can faithfully reproduce a line in all orientations with a scanning pixel that is just equal to the line width. FIG.

42 illustrates the double scan (out of phase) sine wave which accomplishes the same thing.

Thus, we see by using an appropriate intra-dot scanning pattern we can use a scanning pixel the same size as the minimum line width. This is a tremendous advantage because if we can use a scanning and printing pixel 3 to 5 times as big, the total pixels stored or transmitted is down by 9 to 25 times. The possible uncompressed storage points is not down that much. For a 3 to 1 ratio in pixel sizes, intra-dot scanning is 66%; for 4 to 1, intra-dot scanning is 50%; for 5 to 1, intra-dot is 40% of uncompressed conventional scanning. However, with a type compression similar to facsimile group 4 (2 dimensional compression), the size of the digital storage or untransmitted bandwidth or time is down by the ratio of 9 to 25 times.

Thus facsimile transmissions could be down to 3 to 6 seconds per page from the subminute machines of today.

Mass digital storage documents could be increased by a factor of 10 to 20 times and the speed of scanning greatly increased. This is fine for all types of characters, line drawings, handwriting and business graphics if the document is all black or white.

Figure 43:
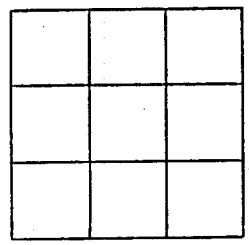
Figure 43:
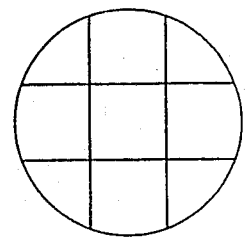

The only problem would be grey scales. If we try to scan with a large grey scale scanning pixel, we get a blurring of a sharp edge that will be worse than the non-grey scale scanning. However, we can use a grey scale scanning pixel as shown in FIG. 43 which is divided into 9 to 25 scanning pixels and we use the criterion that when all elements come to a given value within a given percentage a signal is generated. Accordingly, we get an effective large grey scale pixel with all the advantages of the black and white example.

This gives us data which is quite different from today's grey scale information in that it more accurately defines the edges of grey scale change with a much larger pixel. However, the information is irregular in time between pixels as compared with today's grey scale scanning. Depending on how we are going to use this scanning information, we must process this information accordingly to get a properly reproduced picture. However, the larger pixel size for the same or greater definition will have potential rewards such as transmission band width, time to scan, etc.

This has potential implications in sending television pictures or reproducing a photograph.

Commercial optical scanning systems which can be modified to utilize the present invention are described in the Ricoh Bulletin, IS30, No. 8506-T A-8506, 8401, April, 1984.

Scanner System for Line Thermal or CCD Printer Using Synchronized Intra-Dot Scanning The scanning head should match the printhead both in geometry and motion. As a result, the scanning elements should be as shown in FIG. 19 and the motion should be as shown in FIGS. 21 or 18.

Converting Standard Raster Graphics To Synchronized Intra-dot Scanning Format

Assuming that standard raster graphics are in sufficient detail to warrant it, the conversion to synchronized intra-dot scanning format can be made a software program. Basically the method is as follows: The standard raster graphics (with a dot size to match the matrix size) is put into a bit map window which progresses as the processing is completed. The software moves a larger dot (as used in synchronized scanner format) through the bit map on a scanning path that matches the synchronized scanning format until a match is obtained. So basically the software does what was proposed in the physical scanner in the two previous paragraphs. In the same way it is possible to convert from intra-dot scanning to inter-dot scanning.

Facsimile System Using Synchronized Intra-dot Scanning

This system uses a synchronized scanner for transmitting and a synchronized scanner printer for reception. A good combination would be the synchronized scanner described above with the thermal line printer. The major advantage is an increase in matrix definition (resulting in letter quality output) with increased printer speed and no increase in transmission time using a modified group 3 or group 4 compression system. (For description of such compression system, reference should be had to EIA standards). Conversely, if we desire greater transmission spread we can reduce the transmission time to 3 to 6 seconds as described above under Input Scanning of Documents with Intra-Dot Scanning.

Ink Jet Printers Drop on Demand Type with Thermal or Piezo Electric Actuators

Mechanical vibration of ink jet elements using a resonant mount to reduce the driving power is shown in FIG. 32.

The ink jet print head is a modification of the Datek products SI480 printhead illustrated in the October 1986 issue of "The Datek Printer Report," a piezo electric modulator 101 is placed between the orifice plate 100 and the upper body 102. The piezo electric modulator 101 is a piezo-electric element in parallel shear that moves the orifice plate 100 in a sinusoidal fashion in the direction of the double arrow 102. Holes in 101 are larger than the orifice plate holes but match the holes in the orifice plate 100. The piezo-electric modulator 101 deflects the ink jet so as to perform the desired intra-dot scanning. However, the amplitude of the ink jet elements is only a small fraction of the oscillation of the resulting intra-dot scanning. This is because the ink droplet is truly ballistic and the largest deflection of the dot occurs when the velocity of vibration is at the maximum which is when the instantaneous amplitude is going through zero deflection.

For example, let's consider a drop on demand ink jet making an 8 mil dot with a refire rate of say 8 KHz. Let us assume we want an intra-dot frequency of 8 KHz and a peak deflection of plus or minus 4 mils. Let us assume the drop velocity is 250"/sec and the spacing to paper is 40 mils or time of flight of 160 $\mu$Seconds. Since the peak deflection velocity is peak deflection divided by time of flight, we need about 25"/sec peak velocity. The amplitude of oscillation to get this peak velocity is (peak velocity) divided by $2\pi f$ or plus or minus 0.5 mils amplutude to obtain a dot deflection of plus or minus 4 mils. This amplitude of vibration required is inversely proportional to intra-dot frequency so that at 16 KHz we would only need plus or minus 0.25 mils deflection. This makes the intra-dot scanning of ink jets very practical.

The intra-dot scanning patterns used can be any of those described for impact printing, laser, or ion deposition. Accordingly, the patterns of FIGS. 2, 3C, 3D, 3E, 4, 5, 6, 7, 9, 11, 18, 21, 26, 27, 29, 30, 35, 36, 37 can be used. Ink jets can generate dot sizes from 4 mils to 16 mils and come in a variety of technologies and ink. The maximum amplitude before dot smear will vary depending on the technology used and the ink used. The ideal intra-dot pattern will vary on whether one is trying to do primarily characters or graphic printing and whether the graphic printing contains half tones using so called "dither patterns" or error diffusion.

Regardless of the particular printer designs objectives and technologies, the addition of intra-dot scanning will allow increased speed and/or increased definition and/or lower cost.

Ion Deposition

Intra-dot scanning has the same advantages in ion deposition systems as we had for laser printers. We can increase the effective resolution with the same dot size or we can increase the dot size and keep the same resolution or we could use a combination of both.

Figure 33:
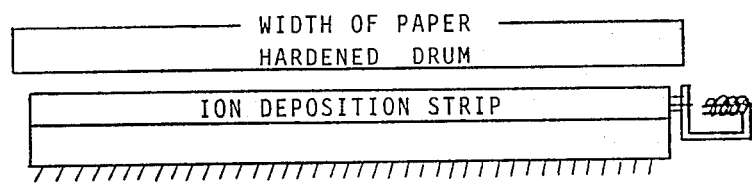
FIGS. 33, 34, 34A, 34B, 35, 36, 37 and 38 illustrate the use of an ion deposition system as a printer employing the present invention.

One way of performing the intra-dot scanning is to mechanically move the ion deposition strip in the same manner as we move the jewel and end of pins on an impact printer. In this type of system the ion deposition mechanism preferably has the arrangement employed in the Delphax 2460 system (see U.S. Pat. Nos. 4,365,549, 4,282,297, 4,195,927, 4,160,257, 4,155,093, 4,267,556). The mounting of the ion deposition strip would resonant at the 2000 to 3000 Hz of the intra-dot scanning as shown in FIG. 33.

The period of the intra-dot scanning must be smaller than dot diameter and equal to or a submultiple of graphic matrix used. The same type of method as used in FIGS. 14 and 17 must be used to synchronize the scanning.

Figure 34:
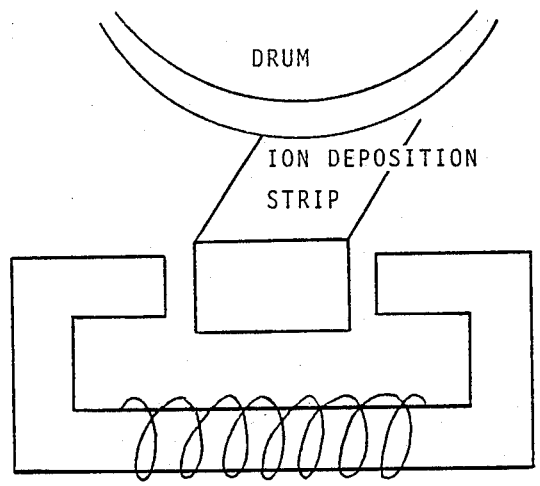

Another possible way of performing intra-dot scanning is to magnetically deflect the ion beams as shown in FIG. 34. This method could be non-resonant and would have the advantage of no moving parts.

Figure 34A:
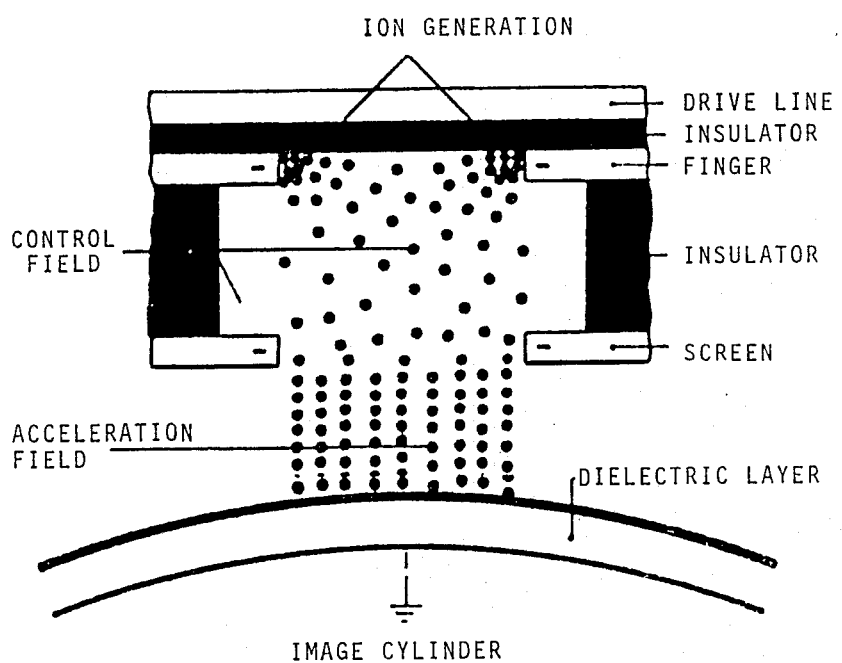
Figure 34B:
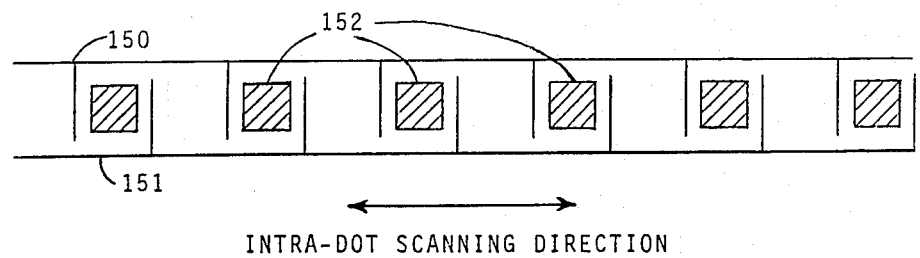

Another way of deflecting the ion beam is electrostatically as shown in FIGS. 34 and 34b. FIG. 34a shows an enlarged view of an ion generator and FIG. 34b shows a plan view looking down on a series of ion generators. The ion generators are shown as the cross-hatched squares 152. Between the ion generator and the image cyclinder is placed the intra-dot deflections electrodes 150 and 151 which are driven so as to obtain the desired intra-dot scanning. The two deflection electrodes 150 and 151 are driven in a push pull fashion wth respect to the negative screen potential shown in FIG. 34.

There are several methods described below of using intra-dot scanning to advantage with ion deposition.

Case I

Figure 35:
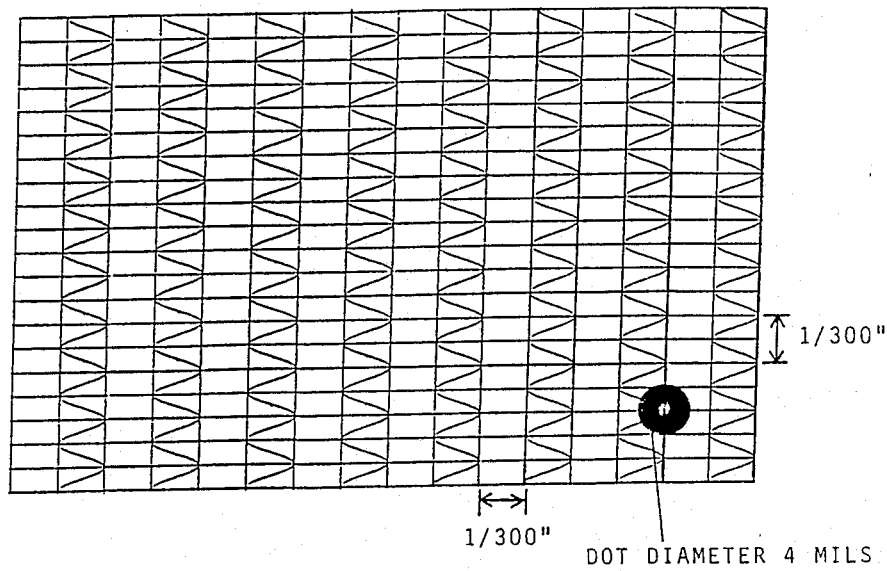

Use of 50% of the ion deposition elements. Say for 300 DPI we space the ion deposition elements every 1/150" instead of every 1/300". We intra-dot scan the elements with a peak to peak amplitude of 1/300" with an intra-dot period of 1/300" as shown in FIG. 35. We fire the ion beam on the top and bottom peak of the sine wave.

Advantage—We have reduced the ion deposition elements by a factor of 2 plus the driver circuitry as well with a resulting cost savings.

Disadvantage—We must modify the input data to compensate for scan. This simply involves interpolation between two lines of data and should be quite simple.

The same system can be used to double the resolution using the same number of ion deposition elements.

Figure 36:
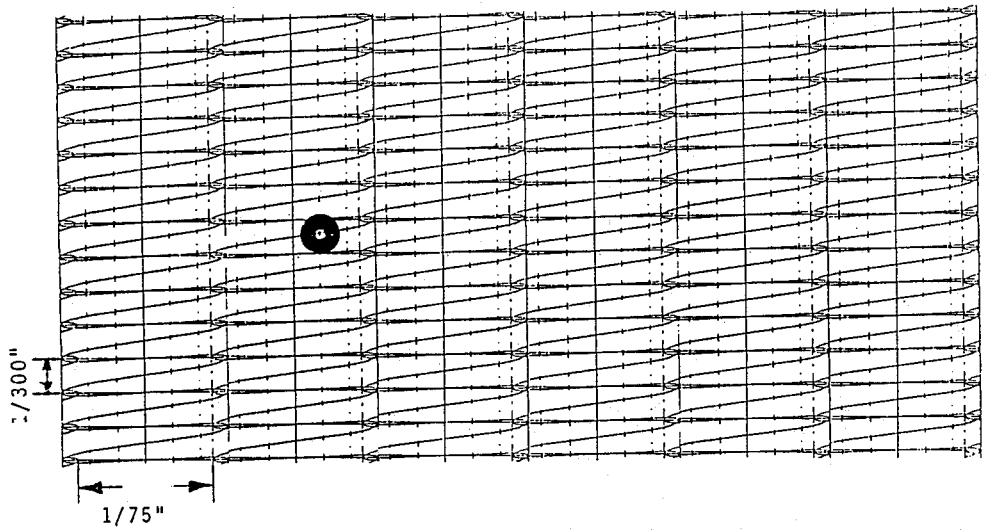

FIG. 36 shown a modulation pattern that will decrease further the number of elements. Here we use a pseudo sawtooth by appropriately adjusting the plane of the vibration coordinated with the speed of the drum. By separating the elements to 1/75" and keeping the intra-dot period to 1/300", we reduce the number of ion deposition elements to 25%.

Case II

Figure 37:
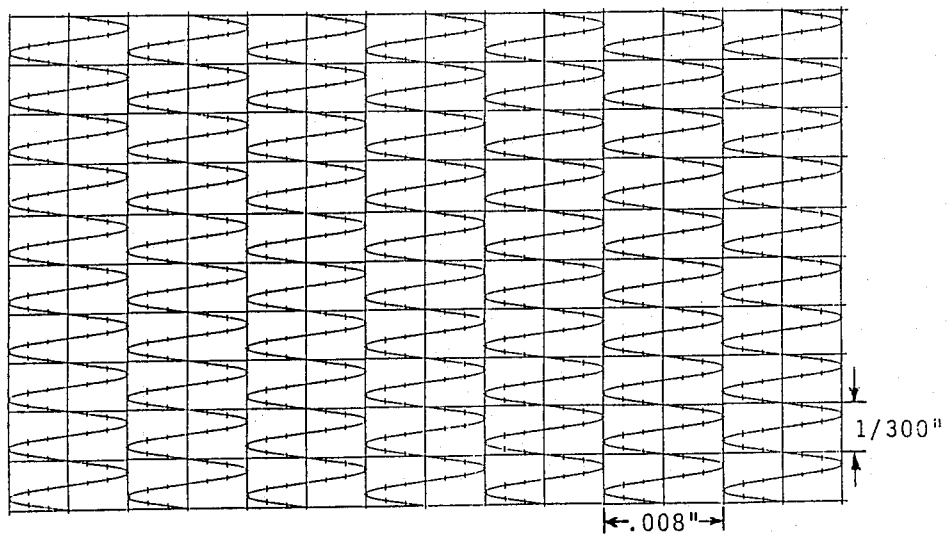

In this case, we double the size of the dot to say 9 to 10 mils and keep the resolution the same by intra-dot scanning by using the modulation pattern shown in FIG. 37. This is basically the same pattern that was used to print the print samples in FIG. 44.

The advantage of the larger spot size and intra-dot scanning is both increased speed as well as reduced electronics. The speed of the electronics as well as the speed of the mechanical components is reduced by the square of the spot size. Thus a 8-10 mil dot ion deposition printer using $\frac{1}{4}$ as many ion deposition elements, using intra-dot scanning and having the same output speed as a 300/inch ion deposition printer would have character ROM, before compression, one third the size, and its electronics in general would be one tenth as fast.

Computer Monitor Using Synchronized Intra-Dot Scanning

Figures 44, 45:
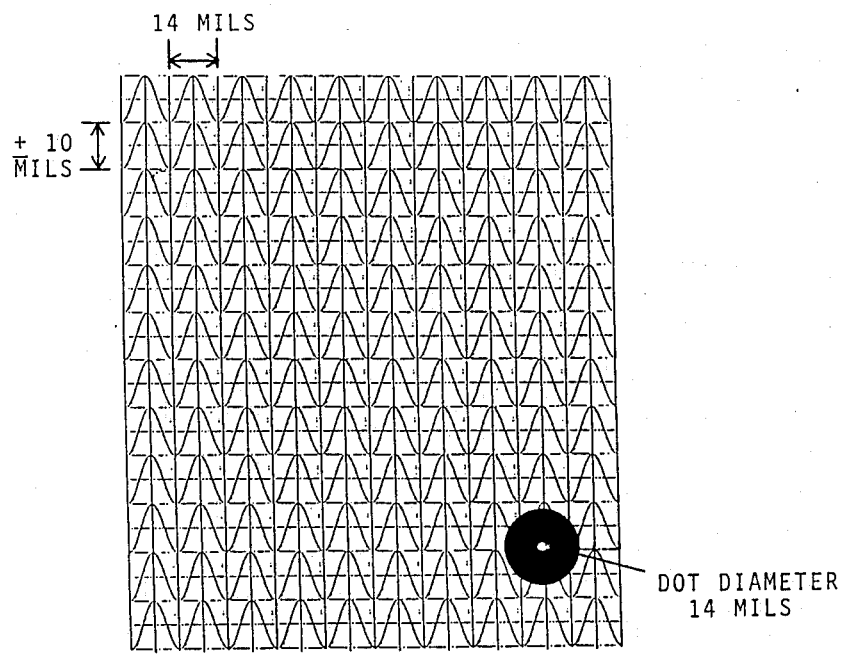
FIG. 44 shows a print sample made using the present invention.
FIG. 45 illustrates an adaptation of the invention to a computer monitor.

The electron beam is vertically deflected as it scans horizontally as shown in FIG. 44. Assuming a spot size of 14 mils with a spacing between scans of 7 mils, the beam would be deflected sinusoidally plus or minus 10 mils while the beam was moving horizontally 14 mils. The characters are generated as in FIG. 3A. The synchronized intra-dot scanning permits the generation of far better quality characters than can be generated today including Kanji characters and higher definition graphics. The increase in definition will be limited by the character ROM, but could increase the definition from 7×9 characters to as much as 24×36 characters. Correspondingly, much greater graphics can be displayed.

Graphic Resolution with Intra-Dot Scanning

Graphic printing is always a function of the resolution with which the original image was digitized. Intra-Dot Printing is no exception. If the original image is intra-dot scanned to match the intra-dot printing, we obtain excellent resolution (up to 500 dpi) with the same speed as character printing. This method could be very useful in the mass scanning and storing of documents. Ultimately, when all printers use intra-dot printing, the preferable way of digitizing will be intra-dot scanning.

However, the immediate problem is how to print graphics that have been digitized 72×72, 144×144, 288×288 or 216×216. The easy answer to this is to stop the intra-dot printing and print exactly as we do today. We have the speed advantage with character printing and non-speed advantage with graphic printing.

If we are using a vector to raster processor for plotting type graphics, we can convert the processor output for intra-dot printing and keep the speed advantage.

Business graphics will be rather simple to convert to intra-dot printing and should result in considerable speed advantage.

Other graphics printing has to be taken on a case by case basis. In many cases, we can convert existing graphics software with algorithms to intra-dot printing.

In other cases, we may want to stop the intra-dot printing and lose the speed advantage.

If we want to optimize the conversion from present graphic digitization to intra-dot printing, we can use a pseudo sawtooth scan by tilting the sine wave resonance off the perpendicular axis to the carriage motion to get the intra-dot scan shown in FIG. 38. If we make the period of the intra-dot scan equal to the horizontal graphic matrix, conversion is ideal. This solution is ideal for one horizontal carriage speed and is less than ideal for other carriage speeds. However, this illustrates one of the many design compromises available to optimize the printer design to a given market niche.

I claim:

1. A device for recording data on a display medium by use of dot matrix recording means having a predetermined matrix size, first and second dot creating means having refire times for creating dots, means for scanning the recording means with a linear motion in a major direction normal to advancement of the display medium relative to the dot matrix recording means occurring between scans in the major direction, said second dot creating means being spaced a predetermined distance from said first dot creating means in a direction normal to the major direction, and means for imposing on said motion is said major direction a cyclic variation transverse to said major direction, said cyclic variation having a peak to peak amplitude at least equal to said predetermined distance to provide an integral number of possible print positions of at least two during each cycle of said cyclic variation.

2. A device according to claim 1 said transverse scanning motion having a frequency sufficiently high to move said second dot creating means to a position adjacent, in the major scanning direction, to a dot created by the first dot creating means within a time shorter than the refire time of the first dot creating means.

3. A device according to claim 1, said cyclic variation having a peak to peak amplitude between one and three times said predetermined distance and comprising means for activating said dot creating means at said integral number of possible print positions along each cycle of said cyclic variation, said integral number being at least twenty.

4. The device of claim 1 wherein said cyclic variation completes one cycle in a space of 1/60 inch.

5. The device of claim 1 wherein said cyclic variation completes one cycle in a space of 1/120 inch.

6. The device of claim 1 wherein said cyclic variation completes one cycle in a space of 1/90 inch for printing 10 and 15 characters per inch and 1/96 inch for printing 12 characters per inch.

7. The device of claim 1 wherein the dots created are at least as large as the matrix size.

8. The device of claim 1 wherein the device is a serial impact dot matrix printer.

* * * * *